United States Patent [19]

Howells et al.

[11] 4,297,879
[45] Nov. 3, 1981

[54] WELL LOGGING CORRELATION METHOD AND APPARATUS

[76] Inventors: Anthony P. Howells, 12503 Mile Dr., Houston, Tex. 77065; Ronald E. Diederich, 4015 Swarthmore, Houston, Tex. 77005; Jorg A. Angehrn, 2606 Brammel Timbers La., Houston, Tex. 77068

[21] Appl. No.: 54,072

[22] Filed: Jul. 2, 1979

[51] Int. Cl.³ .............................................. E21B 49/00
[52] U.S. Cl. ...................................... 73/152; 340/860
[58] Field of Search .................... 73/151, 152; 33/142; 364/422, 804; 340/860

[56] References Cited

U.S. PATENT DOCUMENTS 3,241,102 3/1966 Peterson ........................ 364/422 X
3,497,958 3/1970 Gollwitzer ........................ 73/151 X

FOREIGN PATENT DOCUMENTS 1440521 6/1976 United Kingdom ................ 364/422

Primary Examiner—Jerry W. Myracle
Attorney, Agent, or Firm—Richard M. Byron; Pat McCollum

[57] ABSTRACT

Improved methods and apparatus are provided for correlatively matching, recording, and displaying, two or more sets of logging data measurements with respect to the borehole depth at which they are generated, and independent of their historical or real-time character. In a particular embodiment of the invention, measurements from each set of data derived or sampled at correlative depths are adjacently displayed in graphical form during a logging operation. The depth offset between the measurements is visually or automatically detected, and in response thereto, the subsequent correlation of other selected measurements and depths at which subsequent measurements are derived are thereby adjusted for further processing, display and recording.

98 Claims, 4 Drawing Figures

WELL LOGGING CORRELATION METHOD AND APPARATUS

RELATED CASES

This application derives priority under co-pending U.S. patent application Ser. No. 949,592, which was filed Oct. 10, 1978.

BACKGROUND OF THE INVENTION

This invention relates to novel methods and apparatus for providing a plurality of functionally integrated subsurface logging measurements. More particularly, this invention relates to techniques for providing pluralities of logging measurements each of which is integrated on the basis of borehole depth.

It is often necessary, in the search for subsurface oil and gas-bearing earth formations, to survey or "log" the formations by passing a logging sonde through a borehole which measures several parameters at various depths within the borehole. This information is thereafter processed, analyzed and compared to similar data generated at correlative depths in accordance with known functional relationships to determine whether the formation is of commercial interest.

A serious problem with such comparison of data is that frequently only comparison or "matching" of data points generated at the same borehole depth or time, or generated at a preselected correlative different depth or time, will yield meaningful results. However, because measurements are often made during two or more passes through the borehole, it is often difficult to insure that measurements from each pass selected for comparison were made at the same relative depths or times.

One reason for this is that depth indications at which measurements are made have been historically unreliable, being dependent on several factors which include differences in downhole assemblies, borehole fluids and logging cables to name but a few.

Moreover, the conventional depth measuring method of measuring passage of the logging cable over a measuring wheel introduces still further variation in recorded depth measurements. For example, dimensional variations of the measuring wheel due to temperature and wear, as well as oscillation of the measuring wheel from varying cable tension contribute to the depth measurement variations. Still further, logging cable slippage past the measuring wheel and logging cable stretch due to temperature and humidity effects, the weight of the cable and logging tool, and tension due to borehole strictures further compound the problem of obtaining accurate depth indications.

When a parameter or logging curve generated during one logging operation is to be compared with an identical parameter measured at an earlier time within the same borehole, difficulties are encountered due to the hereinabove noted problems which render the matching of data points derived at the same depths extremely difficult. However, the correlation of data points becomes even more difficult when the identical parameters are not being compared, due to the dissimilarity in the logging curve appearances and values. Still further, it is sometimes necessary to compare measurements derived from correlative depths within different boreholes, and again, even when the measurements are with respect to identical parameters, such comparison is often rendered extremely difficult. Moreover even though measurements may be derived as a function of depth in response to a depth-dependent command signal sent downhole as disclosed in the hereinbefore noted copending U.S. patent application Ser. No. 949,592, the above noted factors may still contribute to apparent discrepancies in depth at which measurements from two or more logs are made.

Various techniques have been used in the past to correlate two or more sets of well logging data points. One such technique involves the side-by-side visual comparison of conventional film-type logging records of two or more parameters, whereby logging curves on one such film may be shifted with respect to the other, and correlative measurements thereafter read and recorded from the film. This attempted solution has numerous disadvantages, such as the inability to make such correlations in real-time as the log to be correlated is generated, the need for conventional film-type log records, and the fact that the end product of such a correlation is not in a form suitable for further conventional processing.

Another attempted solution to the problem of providing correlated logging measurements has been to store each set of logging data by an appropriate means, such as digital tape recordings, and thereafter selectively retrieving matched data pairs derived at similar depths for further processing. One obvious problem associated with this method is that, as with the use of graphical light table approaches, all data to be correlated is first generated and recorded. Thus the possibility of real-time processing of data correlated as it is generated and the real-time recording of such correlated data is precluded.

Yet another problem with this approach is that frequently no sample from the second set of data is available which was derived at the identical borehole depth as the sample from the first set of data. Thus, it may be necessary to interpolate between data points from the second set to estimate a sample value which will correlate with a sample from the first set with respect to the depth at which they were derived.

Thus, it should be readily apparent that it would be desirable to provide a method and apparatus whereby any logging parameters of interest may be insured of being measured at correlative borehole depths during successive passes of the sonde through the same boreholes or different as any other such measurements previously derived, so as to increase their usefulness for data accuracy and reliability checks, for combining such measurements derived at correlative borehole depths to determine functional relationships, and the like. Accordingly, it would also be highly desirable to adjust the depth at which future logging measurements are generated or sampled in response to either visual or automatic analysis of the presently generated samples either alone or in comparison with other historically derived data. Moreover, it would also be desirable to sample or select on a depth basis historically derived samples for correlative matching with respect to depth with samples from other data sets by a visual or automatic comparison of other sample points from each of the data sets. These and other features are provided in the present invention which also overcomes the hereinbefore noted serious problems associated with the prior art, wherein novel techniques and apparatus are provided for correlating two or more sets of logging data in a manner to be hereinafter more particularly set forth.

SUMMARY OF THE INVENTION

In a preferred embodiment of the present invention, measurements of at least one well logging parameter are generated at preselected elevations within the borehole and are recorded as a function of depth. A sonde is provided for making such measurements, whereby the sonde will generate and transmit the measurements to the surface in response to a depth-dependent command signal relayed downhole to the sonde. A graphical visual display of the measurements is thereafter made by replaying the recorded samples sequentially in spatial relation to the depth indications at which they were made in the order in which they were derived. A next logging operation is simultaneously begun with the visual display, which also generates logging measurements as a function of the depth command and at the same or correlative preselected elevations within the borehole as measured in accordance with apparatus which determines the sonde depth. Each such logging measurement is then correlatively displayed as it is generated with the correlative measurement from the prior logging data set which was generated, according to the sonde depth measuring apparatus, at the identical or correlative borehole depth and in spatial relation thereto. Several such measurements from both data sets derived over an increment of borehole are compared, and any discrepancy between apparent depths at which samples from each such displayed data sets were derived is noted.

Preferably, for example, the spontaneous potential or natural gamma ray log parameters are measured and recorded during traversal of the sonde through the borehole, along with other parameters which may be of interest. All such parameters are generated or sampled as a function of identical or related preselected depth intervals. During any next pass through the same or different borehole, the same spontaneous potential or gamma ray log is preferably generated or sampled, as well as other parameters which may include all or part of those previously measured or yet additional different parameters. All such measurements are again preferably made at depths correlative to those of the first pass. As the measurements of the next pass are thus being made, the parameter measurement common to both passes is preferably graphically displayed and compared side by side, wherein those of the prior or "historical log" are selectively and sequentially retrieved, and displayed from the recording in the order in which they were produced. More particularly, all such measurements are preferably displayed in a scrolling fashion as disclosed in copending U.S. patent application Ser. No. 030,058, entitled "Well Logging System and Method," which was filed Apr. 13, 1979, wherein the vertical axis corresponds to borehole depth and the horizontal axis corresponds to parameter magnitude. By comparing similar distinctive curve perturbations or shapes in magnitude between portions of the two logs which preferably include those generated in the past as well as those just generated, discrepancies or depth offsets may be detected whereby measurements between the two passes may appear to have been taken at different depths. In response to such comparison, and in functional relation to said noted discrepancies, the depth commands are thereby adjusted so as to cause subsequently derived real-time samples from the sonde to be derived at greater or lesser depth intervals which will be more correlative in depth with their historical counterparts.

These subsequently derived real-time samples are also thereafter visually displayed correlatively with samples from the historical data set derived at correlative depth within the borehole as indicated by the depth indicating apparatus, and again any such depth discrepancies are noted, whereupon the depth command may be thereafter further adjusted in accordance therewith. By correlating the same parameter in subsequent sonde passes, it will be appreciated that all other parameters from each pass will thus be correlated as they too are being generated as a function of the adjusted depth command.

In a preferred embodiment of the present invention, the sonde depth detecting apparatus comprises a pulse generator which generates pulses as a function of the angular rotation of the sheave wheel over which the logging cable passes. A pulse counter is provided whereby upon the counting of a preselected number of such pulses generated (Y) by the pulse generator, a depth command is generated so as to cause a next measurement to be made by the sonde.

The counter may be pre-biased after each generation of a depth command, so as to subtract or add a preselected variable number (X) of pulses to the incoming pulses until the preselected number of pulses generated (Y) is reached and the next input command thus generated. Thus, the depth command in this manner will, in turn, cause generation of the next real-time sample at a depth interval larger or smaller, respectively, than the prior interval by a factor of plus or minus X/Y. Means are provided for repeatedly generating this adjusted input command as a function of the difference in depth between the apparent depths at which samples from the two data sets were derived, which may be perceived visually by the hereinbefore noted display, or automatically. Thus, the depth offset will gradually be adjusted or "smoothed out" whereby apparatus will resume taking measurements at the depth intervals correlative to the historical data every (Y) pulse occurence.

Accordingly, it is a feature of the present invention to provide a plurality of functionally integrated sub-surface logging measurements.

It is another feature of the present invention to provide novel methods and apparatus for generating or sampling real-time logging measurements at depths within the borehole correlative to depths at which historical logging measurements were made.

It is another feature of the present invention to provide methods and apparatus for selecting from historical logging data samples derived at depths correlative to those of another different set of historical logging data.

A further feature of the present invention is to provide methods and apparatus for smoothly correcting depth errors occurring between logging data samples from at least two sets of such samples over a preselected increment of borehole depth.

It is a further feature of the present invention to significantly improve the derivation of functional relationships between measurements of two or more logging parameter data sets derived as a function of depth, including accuracy and reliability thereof.

It is another particular feature of the present invention to provide a method and apparatus for investigating the character of subsurface earth materials and the like traversed by a borehole, comprising deriving an electrical command signal as a function of depth in said borehole, deriving a first electrical measurement of said earth materials in response to said command signal, deriving a second electrical measurement of said earth materials, and incrementally adjusting said command signal to record said first measurement signal in correlation with said second measurement signal and said depth indicaton.

In the Drawings

DETAILED DESCRIPTION OF THE DRAWINGS

As hereinbefore explained, the present invention is directed to an improved well logging system of the type depicted in our prior copending U.S. patent application Ser. No. 949,592, filed Oct. 10, 1978, and reference may be had thereto for details of the system. Thus, the disclosure of the prior application is considered to be incorporated herein for all intents and purposes and with reference to a full understanding of the improvement of the present invention. It should be apparent that FIG. 1 of the accompanying drawings parallels FIG. 2 of the prior application. The operation of the improved correlation circuitry of the present invention and its environment are thus identical with that of the prior application, except as hereinafter set forth. The prior application should therefore be referred to for a complete understanding of the overall digital well logging system operation and for the location and coaction of the improved correlation circuitry disclosed herein.

Figure 1:
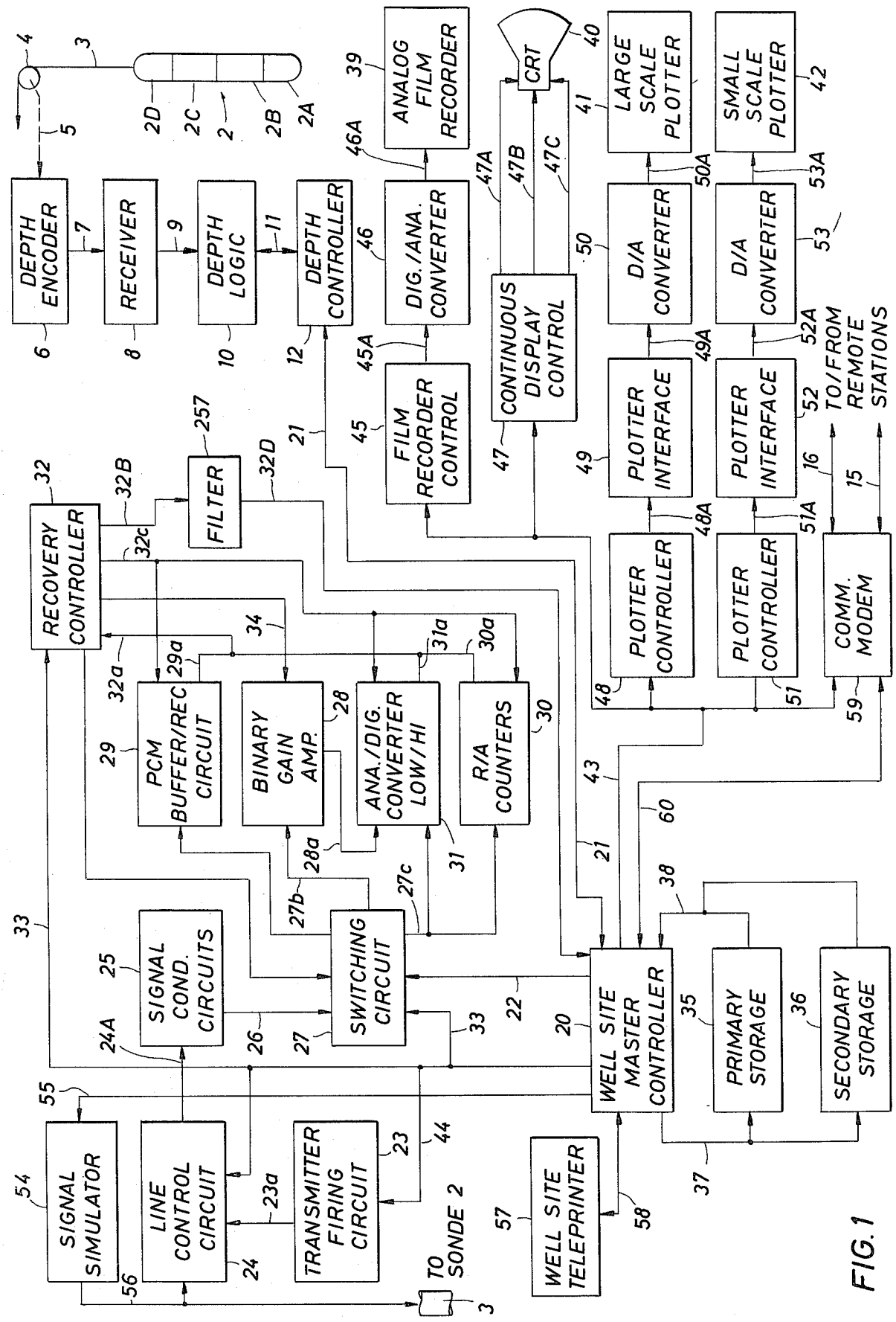
FIG. 1 is a functional representation of one embodiment of the invention.

Referring now to FIG. 1, there may be seen a simplified functional diagram of one embodiment of the present invention, and wherein there is more particularly shown the logging sonde 2 which may suitably include such portions as a radioactivity logging section 2A, an induction logging section 2B, an acoustic logging section 2C, and a pulse code modulation section 2D, all arranged to provide appropriate measurements of the lithology surrounding a subsurface borehole (not depicted). Measurements from these sections may be conveniently transferred from the borehole to the surface by way of a conventional logging cable 3 which is arranged to rotate a sheave wheel 4, or the like, to provide a correlative indication of the borehole depth at which such measurements are taken. More particularly, the sheave wheel 4 may also be conveniently coupled to suitable depth encoder circuitry 6, by a drive shaft 5 or the like, whereby the depth encoder circuitry 6 will deliver a functionally correlative depth measurement signal 7 to the surface portion of the well site system, in conjunction with the measurements provided by the logging cable 3.

As previously stated, it is a feature of the well site system depicted functionally in FIG. 1 to transmit fully correlated logging measurements to a suitable base observation and control station such as that referred to in copending U.S. patent application Ser. No. 949,592, filed Oct. 10, 1978, and which, in turn, may be suitably located at a position remote from the location of the well site system. Accordingly, and as will hereinafter be explained in detail, the well site system will appropriately encode and condition these measurements to provide correlative indications to the remote base station, at the time such measurements are received from the logging cable 3, through a suitable communications link 15 which may be a conventional telephone line, radio communication satellite, or the like. Furthermore, like signals may also be provided to the customer or user at his respective user station (not depicted) which, in turn, may be located remotely from both the well site system and the operator's base station (not depicted). These indications, may also be conveniently transferred to the user station by a similar communications link 16 interconnecting the well site system with the user station, and thereafter relayed to base station by means of another different communications link (not depicted), or they may be relayed from the base station to the user station on such communications link. It should be noted that the well site system suggested by FIG. 1 may be operated directly by the base station, and therefore the communications link 15 may also include provision for delivering suitable control signals from the base station to the well site system by way of the communications link 15. Similarly, the communications link may be used to provide control signals from the base station to the user station or, in some circumstances, to provide control signals from the user station to the well site system or base station, by way of the communications link 16.

Referring again to FIG. 1, there may be seen a simplified functional diagram of the uphole circuits comprising the apparatus located at or composing the well site system. As will hereinafter be explained in detail, the sections of the logging sonde 2 are preferably adapted to deliver their respective measurements to the conductors composing the logging cable in a manner whereby all of the measurements are delivered to the surface together. It should be noted that information may also be desirably transferred from surface circuitry to the borehole for reasons to be hereinafter explained in greater detail. For example, it may be desirable to control various transmitters and receivers contained in acoustic logging section 2C from the surface. Accordingly, it may be seen from FIG. 1 that at appropriate times and in response to a command signal 44 from a well site master controller 20, transmitter firing circuitry 23 may be caused to generate transmitter firing signals 23A for purposes of controlling the various circuitry in the acoustic logging section 2C of the sonde 2. This transmitter firing signal 23A may preferably be delivered to a conventional line control circuit 24 which couples the signal 23A to the appropriate conductor within the loggng cable 3.

As indicated in FIG. 1, when measurement signals are received from sonde 2, the output of the logging cable 3 is preferably also delivered to a line control circuit 24 which, in turn, passes the signals as its output 24A to a suitable arrangement of signal conditioning circuits 25 for filtering, gain adjustment, and other suitable processing. The conditioned logging signals 26, which are provided by the signal conditioning circuits 25, may then be delivered through a suitable switching circuit 27 to either a PCM buffer/receiver circuit 29, or to a binary gain amplifier 28, or in a further alternative, to a low speed/high speed analog-to digital converter 31 and suitable radioactivity pulse counters 30, by way of signals 27a, 27b, or 27c, respectively.

It is well known that the outputs from a conventional sonde 2 will be in either analog form, or in the case of radiological measurements, will be composed of pulses which occur in a random manner. As will hereinafter become apparent, however, it is particularly desirable for the purposes of the instant invention, that these signals be presented to the surface circuitry in digital form. Accordingly, and as more particularly depicted in FIG. 1, the sonde 2 will preferably include a pulse code modulation or "PCM" circuit 20 for encoding such signals in digital form before delivery to the PCM buffer/receiver circuit 29 shown in FIG. 1. If the signals are not so encoded, however, then they may be conveniently applied to a suitable analog/digital converter 31 or the like, before being processed and recorded. Alternatively, pulses deriving from radiological measurements may conveniently be applied to appropriate counters 30 and the like, which will then suitably deliver their outputs in digital form.

Referring again to FIG. 1, it will be seen that the signals being generated by the radioactivity section 2A of the sonde 2, will accordingly originate as a train of electrical pulses indicating the occurrence of radiations eminating from the borehole materials surrounding the sonde 2, and will therefore be suitably delivered to the pulse counters 30 which, alternatively, produce a suitable digitized representation of this data as output signal 30A. On the other hand, the output signals from the induction logging section 2B and the acoustic logging section 2C of the sonde 2 will, conventionally, be delivered to the surface in the form of analog measurements representative of lithological characteristics of the borehole material adjacent the sonde 2. Accordingly, such outputs from switching circuit 27 which compose signal 27c will, in turn, be converted to digital representations of the data sought to be obtained. These representations, which are indicated as output 31A, will accordingly be conducted by a suitable lead 32A and the like to an input of the logging signal recovery controller 32.

It will be noted that the analog-to-digital converter 31 receives input signals 27c and 28a from both the switching circuit 27 and the binary gain amplifier 28. The reason for this is that, in some cases, the signals generated from the induction logging section 2B and the acoustic logging section 2C of the sonde 2 are sufficient in amplitude to be applied directly to the analog-to-digital converter 31. On the other hand, such signals are often of such a magnitude, or, alternatively, attenuated by the logging cable 3 to an extent that they exceed the dynamic range of converter 31 and must accordingly be attenuated or amplified, respectively, before they can be properly handled by the converter 31. Accordingly, the switching circuit 27 will respond to route such signals to the binary gain amplifier 28 prior to conversion of the analog signal into digital form at converter 31.

More particularly, the well site master control 20 is adapted to generate another command signal 33 to the switching circuit 27 to route its output either in the form of a digital signal 27a to the PCM buffer/receiver circuit 29, or in the form of an analog signal 27c which is delivered to the converter 31 or to the pulse counters 30. If, as hereinbefore stated, the signal 27c is of an insufficient amplitude to be properly handled by the converter 31, or if the amplitude is too great for the dynamic range of the converter 31, then the master controller 20 will, according to program, generate a command signal 22 to cause the switching circuit 27 to deliver its output signal 27b (instead of signal 27c) to the binary gain amplifier 28. It will be noted that binary gain amplifier 28 may be provided with a suitable gain control signal 34 which serves the purpose of continuously adjusting the gain of binary gain amplifier 28 in response to command signal 33 delivered to recovery controller 32 from master controller 20. It will be seen that because the input to analog-to-digital converter 31 may be periodically interrogated by master controller 20 in a manner to be described hereinafter, master controller 20 may cause gain control signal 34 to appropriately adjust gain of binary gain amplifier 28 so as to insure that input signal 28a is maintained within the dynamic range of analiog-to-digital converter 31. Accordingly, the amplified signal 28a, which is produced by the binary gain amplifier 28, is then delivered to the converter 31 in lieu of the output signal 27c.

Referring again to FIG. 1, it may, for the purposes of illustration, be assumed that the sonde 2 is composed of a plurality of sensing elements such as the radioactivity logging section 2A, the induction logging section 2B, and the acoustic logging section 2C, and that all of these sensors are continually and simultaneously delivering meaningful data signals to the logging cable 3. It is preferable that the well site system sort and handle these signals in a manner to distinguish one from another, as well as to handle such signals in correlation with appropriate indication of the depth at which such signals originated. Accordingly, the analog-to-digital converter 31, the pulse counters 30, and PCM buffer/receiver circuit 29, will all include appropriate buffer circuitry, whereby these signals may be stored until the well site master controller 20 generates its command signal 33 to cause the recovery controller 32 to interrogate the components selected. Upon such interrogation, which is indicated in FIG. 1 by the interrogation signal 32c, the recovery controller 32 will cause the appropriate or selected component to transfer one of outputs 29A, 30A or 31A to the recovery controller 32 which, in turn, conducts such information to a filter 257 on controller output 32b in a manner to be described, delivers filter output 32d to the master controller 20. Upon receiving output 32b, the master controller 20 conducts such output to either the primary storage facility 35, or the secondary storage facility 36 by means of the input signals 37.

As hereinbefore stated, the measurements provided by the logging sonde 2 must be correlated with an indication of the depth at which such measurements are taken. Accordingly, it should be noted that when the master controller 20 generates its command signal 33, it also generates an appropriate depth data/control signal 21 to cause the depth controller 12 to deliver the information it has previously taken from the output 11 of depth logic 10. Thus, this data, which also passes to the controller 20 by way of the depth data/control signal 21, will be correlated effectively with the logging data signals provided by the recovery controller 32 in the form of output 32b. It will be noted that in order for depth logic 10 to provide appropriate information to depth controller 12, information from depth encoder circuitry 6 may conveniently be transmitted to receiver 8 by means of depth measurement signal 7, and from receiver 8 to depth logic 10 on receiver output 9.

There may further be seen in FIG. 1 visual display and recording devices which may preferably include analog film recorder 39, visual display 40, and a suitable large scale plotter 41 and small scale plotter 42. Information which is desired to be displayed or recorded may be transferred to these various display or recording apparatus from master control 20 through logging data information signal 43. More particularly, information signal 43 may be desirably routed to a film recorder controller 45 which will provide necessary interfacing between master controller 20 and digital-to-analog converter 46, and thereafter communicated from controller 45 to converter 46 on output line 45A. After conversion of the digital information on line 45A by converter 46 to analog information, this analog information may be conveniently coupled by output line 46A to analog film recorder 39. It should be noted that recorder 39 may preferably be a conventional galvanometer type recorder well known in the well logging industry which is particularly suited for recording graphical data and the like associated with well logging operations.

In like manner, data from master controller 20 carried on information signal 43 may also preferably be communicated to continuous display controller 47 which may process these signals to provide output signals 47A, 47B and 47C which are communicated to visual display 40. More particularly, and as will hereinafter be explained in detail, continuous display controller 47 may preferably process information signal 43 so as to generate a visual picture of desired well logging information over a preselected borehole depth interval which has been traversed by sonde 2.

Still further, it may be seen from FIG. 1 that the information signal 43 may be conveyed to a plotter controller 48 for processing the desired information signal 43, in a manner to be hereinafter described in greater detail, prior to being delivered as input 48A to a suitable plotter interface 49. The function of the interface 49 is to further adapt these information signals 43 for delivery as output 49A to suitable processing circuitry such as a digital-to-analog converter 50, wherein they are converted to an appropriate analog output 50A for recording on film within the large scale plotter 41. In like manner, it may be desirable to display various information signals 43 associated with the well logging operation on a smaller scale than that employed in large scale plotter recorder 41. Accordingly information signals 43 may be introduced into plotter controller 51 which may suitably process and transfer these signals as output 51A to plotter interface 52 which, after additional signal processing, will communicate these signals as output 52A to suitable circuitry such as a digital-to-analog converter 53 wherein they may be converted to an appropriate analog output 53A to small scale plotter 42. It will be noted that information signals 43 which are provided to analog film recorder 39, large and small scale plotters 41 and 42, respectively, as well as those provided to visual display 40, may be desirably under the control of master controller 20. Accordingly, controller 20 may desirably provide information signals 43 so as to cause display and recording of well logging information in a variety of formats and from a variety of sources. These may include, for example, primary storage 35 and secondary storage 36, which may transfer information stored therein to master controller 20 as storage output 38 and in response to input signal 37.

It will be greatly apparent that for purposes of testing the operation of the integrated well logging system herein described, or for purposes of personnel training or the like, it may be desirable to simulate the various signals associated with sonde 2 without the necessity of actually providing the sections of well logging circuitry normally contained therein, and further without the necessity of subjecting the sonde 2 to an actual borehole environment. Accordingly, in FIG. 1 there may be seen a signal simulator 54 which, in response to appropriate simulator command signals 55A, may generate various test signals 56 as hereinbefore mentioned which, for example, may include signals similar to those which might be expected to be present on logging cable 3 from sonde 2. It will further be noted that these test signals 56 may appropriately be delivered to line control circuit 24, thus simulating similar signals on logging cable 3 which may also be delivered to the input of line control circuit 24. While the present invention contemplates automatic performance of the various well logging tasks under control of master controller 20, it may be appreciated that it is often desirable to include provisions for human interaction with the integrated well logging system of the present invention. For example, it may be desirable for a logging engineer to override various functions performed by master controller 20, to adjust the format or scaling of information provided to the various peripheral display devices, or to communicate directly with base station or user station. Conversely, it may further be desirable for master controller 20 to have the capability of outputting information to a human operator. Accordingly, a suitable well site teleprinter 57 may be provided for such communication between master controller 20 and a human operator having an interrogate/respond channel 58 for interrogating or instructing controller 20 in a conventional manner, and also for receiving appropriate information therefrom.

As hereinbefore stated, it is a feature of the present invention to provide for observation and control of well site logging operations from a remote base station or user station. Referring now to FIG. 1, there may be seen a communications modulator-demodulator or "modem" 59 which may transmit information signal 43 to base station and user station on communication links 15 and 16, respectively, under control of a data/control signal 60 from controller 20. It will furthermore be noted that modulator-demodulator 59 may conveniently be adapted to receive information and control signals from base station and user station on communication links 15 and 16, respectively, which are further communicated to controller 20 as indicated by data/-control signals 60.

Figure 2:
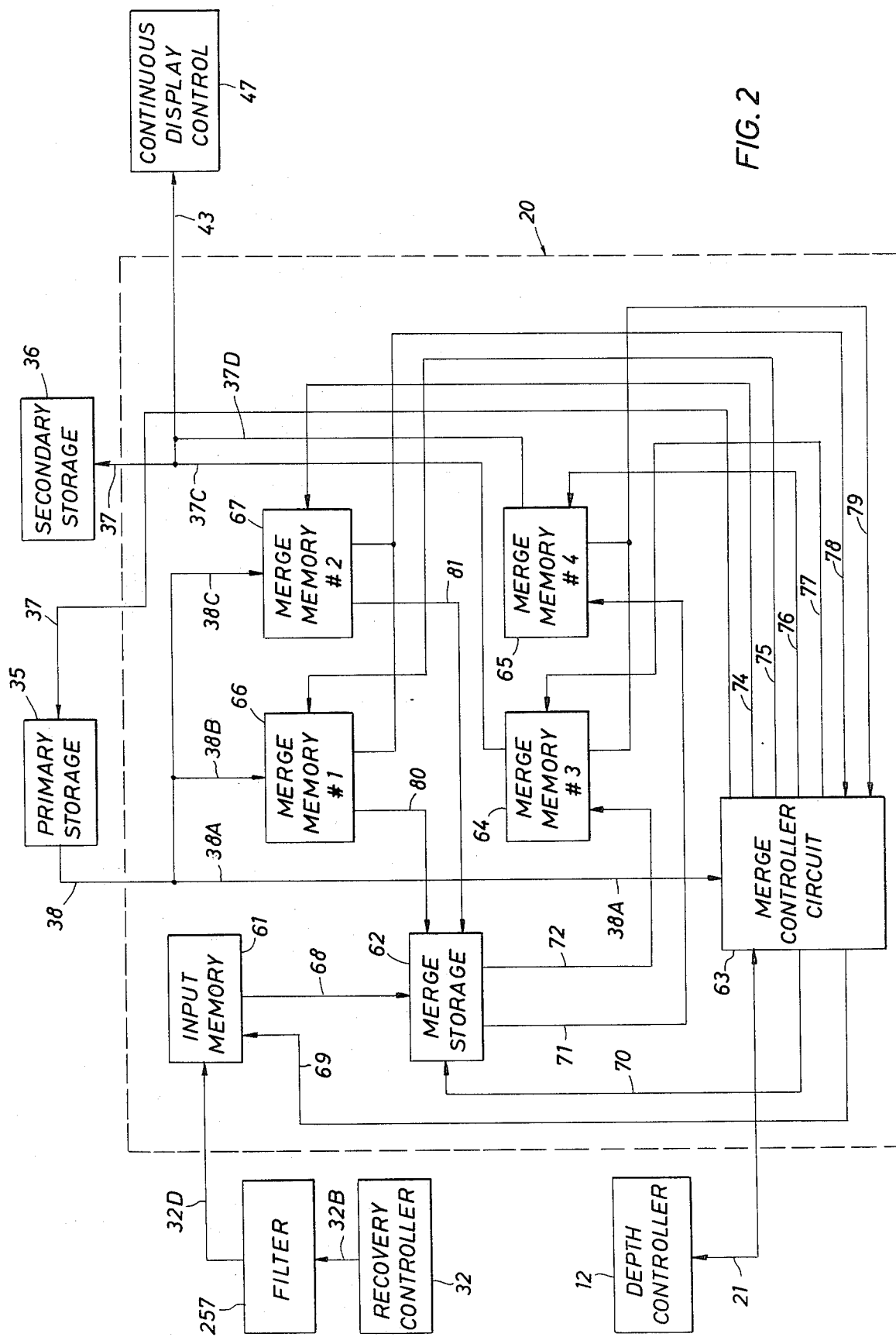
FIG. 2 is another functional representation of the embodiment of the present invention depicted in FIG. 1, showing a more detailed representation of the master controller of FIG. 1.

Referring now to FIG. 2, there will be seen a general functional representation of the manner in which the data "merging" of the present invention is accomplished in a preferred embodiment. It will be appreciated that data samples from one set of data, either historical or presently being generated during a logging operation, will preferably be "matched" or "merged" with correlative ones from another set of data derived at correlative depths for recording and display. These depths at which samples from the first set are derived are preferably correlated in the manner of the present invention to be hereinafter described, whereby the depths at which they are derived are preferably varied in accordance with the display. A primary storage 35, such as a conventional tape drive, may be provided for storing electrical data signals composed of digital representations of well logging measurements derived correlative to a sequence of preselected depths within a borehole. Any desired number of such representations may be retrieved from the primary storage 35 in response to an input signal 37 from a merger controller circuit 63, so as to cause such representations to be delivered out of the primary storage 35 on primary storage output 38 to a suitable merge memory 1, 66, or a merge memory 2, 67, on their respective merge memory inputs 38b or 38c. The merge memories 66 and 67 preferably each provide a memory output 78 delivered to the merge circuit 63, for instructing the merge circuit 63 as to when a particular merge memory 66 or 67 has had all logging measurements removed therefrom, in which case the particular merge memory will be available to receive further representations from the primary storage 38 in a manner previously described.

It will be noted that the merge memories 66 and 67 may further be provided with correlative merge controller outputs 75 and 74. In response to each controller output 75 and 74 from the merge controller 63, the respective merge memories 66 or 67 will sucessively deliver on their respective memory outputs 80 and 81 digital representations of logging measurements derived at successive depths stored in the memories 66 and 67 to a suitable merge storage 62. More particularly, logging measurements in the primary storage 38 are preferably stored therein in the order in which they were derived at successively deeper or shallower preselected depth intervals. The order of these measurements will preferably be retained throughout all transfers through memories 66 and 67, merge storage 62, memories 64 and 75, and eventually secondary storage 36, as will all real-time or historical measurements transferred through the input memory 61, storage 62, merge memories 64 and 65, and to secondary storage 36.

It will be noted that the merge controller 63, in response to the memory output 78 from the memories 66 and and 67, may be designed so as to generate a controller output 74 or 75 so as to cause only one merge memory, 66 or 67, to generate memory outputs 80 or 81, while the other merge memory receives a next number of digital representations on merge memory input 38b or 38c from the primary storage 35. This technique may be recognized as "double-buffering", a technique well known in the art whereby measurements may be selectively retrieved from or stored in one memory while a second memory is being filled with or "reading out" blocks of data to input or output devices. When all of the data is thus sequentially retrieved from the first memory, data will thereafter be sequentially retrieved from the second filled memory while the depleted first memory is thus being again filled with data blocks.

Referring again to FIG. 2, it will further be seen that the well site controller 20 preferably will include an input memory 61 for storing digital representations of well logging measurements derived by the sonde 2 in a manner previously described. It will be recalled that the recovery controller 32 may deliver each such representation, which has been derived on a depth-dependent basis, on the controller output 32b to a filter 257, having a filter output 32d which is thereafter delivered to the well site controller 20 or, more particularly with respect to FIG. 2, to the input memory 61. The purpose of the filter 257 will hereinafter be discussed. It will further be recalled that a depth controller 12 will preferably be provided for generating a sequence of pulses derived from rotation of the sheave wheel, which is in turn correlative to movement of the sonde 2 within the borehole, indicative of and related to different selected depths along a portion of the borehole. These pulses may be delivered as depth/data control signal 21 to the merge controller 63 of the well site controller 20. As each pulse is delivered on control signal 21, a measurement derived in response thereto at a correlative depth will accordingly be present in the input memory 61. The merge controller 63 will, in response to the control signal 21, generate a merge controller output 69, causing a transfer of the sample presently stored in the input memory 61 to the merge storage 62 on the memory output 68. As previously noted, the merge controller 63 is preferably provided with controller outputs 74 and 75 for comanding the correlative merge memory 67 or 66 to deliver a correlative data sample derived at a particular depth from the respective merge memory 67 or 66 to the merge storage 62. Each controller output 74 and 75 will preferably be generated by the merge controller 63 in functional response to receipt by the merge controller 63 of a pulse from the control signal 21 correlative to a particular depth at which a measurement derived by the sonde 2 which is stored in the input memory 61 was derived. Accordingly, it will be appreciated that in response to such a pulse on control signal 21, a next data sample from the input memory 61 and a next data sample from either the merge memory 66 or 67 will accordingly be caused to be transferred and stored in the merge storage 62, and each such pair of next samples will have been derived at correlative depths.

Still referring to FIG. 2, there will also be seen a merge memory 64, and a merge memory 65, each having correlative storage outputs 72 and 71. It will also be noted that a merge controller output 70, generated by the merge controller 63 in response to a pulse from control signal 21, may be delivered to the merge storage 62. The purpose of this controller output 70 is to cause the merge storage 62 to deliver in response thereto the data samples stored in the merge storage 62 on the storage output 71 or 72 to their correlative merge memories 65 or 64 in a manner to be described. In like manner to the merge memories 66 and 67, there will be seen in FIG. 2 a memory output 70 delivered from the merge memories 64 and 65 to the merge controller 63. Also, in like manner, there will be seen merge controller outputs 76 and 77 delivered from the merge controller 63 to the correlative merge memories 65 and 64, these controller outputs being correlative to those of controller outputs 74 and 75 for the merge memories 67 and 66. It may thus be appreciated that the merge memories 64 and 65 are preferably arranged in a "double-buffering" mode, similar to that of the merge memories 66 and 67. Information carried on the memory output 79 may instruct the merge controller 63 as to the relative status of the merge memories 64 and 65. More particularly, the merge controller 63 will thus detect when a particular merge memory 64 or 65 has been filled with a full "block" of data, such as samples derived over a ten foot depth increment. When this occurs, a merge controller output 76 or 77 will command the particular memory 65 or 64 to deliver its respective stored contents on merge memory 37d or 37c to the hereinbefore noted secondary storage 36 by means of the input signals 37, or to a suitable continuous display control 47 by means of the log data information signal 43. While data samples are thus being "read out" from a particular merge memory, the merge controller 63 is, by means of the merge controller output 70, able to command the merge storage 62 to begin filling the remaining one of merge memories 64 or 65 by causing the merge storage 62 to deliver successive paired data samples stored in the merged storage 62 to the particular merge memory 64 or 65 by means of selecting the appropriate storage output 71 or 72 in which these data samples will be delivered.

Figure 3:
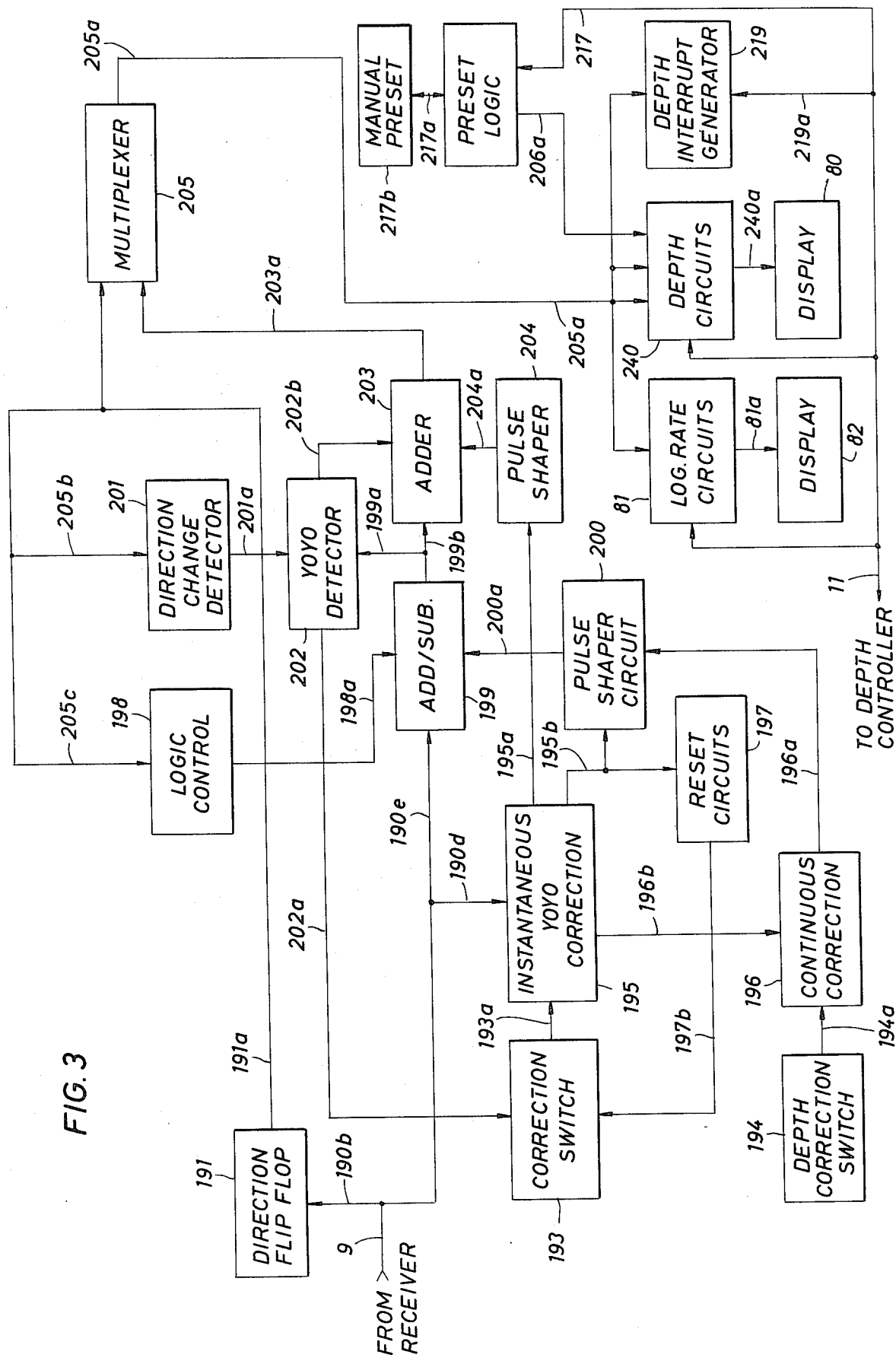
FIG. 3 is a more detailed functional representation of the depth logic of the embodiment of the present invention depicted in FIG. 1.

Referring now to FIG. 3, there may be seen a simplified and more detailed functional diagram of one embodiment of the depth logic 10 of FIG. 1. In a typical well logging operation, it may be appreciated that it is often desirable to obtain at a given moment, or in the alternative, at preselected depth intervals, information relating to the depth of sonde 2 in the borehole, and also the rate and direction at which sonde 2 is traveling within the borehole. Still further, as hereinbefore noted, because it is a feature of this system to generate logging measurements on a depth-dependent basis, it is desirable for the logging system to generate appropriate depth measurement signals to indicate to the master controller 20 when the sonde 2 is at preselected depths in the borehole. Moreover, in order to take such logging depth, rate and direction measurements accurately within reasonable limits, it may be necessary to correct inherent inaccuracies well known in the well logging art. These inaccuracies may arise, for example, from dimensional variations of the sheave wheel 4, logging cable 3 stretch and slippage, and oscillation of the measuring sheave wheel 4, which is commonly known as "yo-yo" and which is due to varying tensions in the logging cable 3. Accordingly, the purpose of depth logic 10 is to provide information required in the logging operation related to logging rate, depth, direction, and the like, as well as to provide to the master controller 20 appropriate depth dependent command signals at preselected depth intervals instructing the master controller 20 when to interrogate various components of the system through the recovery controller 32. It is yet a further purpose of depth logic 10 to compensate this information for inaccuracies such as those herein described and to provide for preselected adjustments of this information so as to permit the merger of two or more sets of logging data taken at different times, for example, and to correct for depth offsets as herein described.

Referring again to FIG. 1, it will be seen that a depth encoder 6 is provided for generating a series of depth pulses so as to be functionally related to the angular motion of drive shaft 5 and sheave wheel 4. It will be noted that these depth pulses may also be related to travel of sonde 2 within the borehole due to the fact that this travel causes sheave wheel 4 to rotate in response thereto. After encoder 6 has generated these depth related pulses, they are transferred as signal 7 to a suitable receiver 8. This receiver 8 provides necessary signal conditioning prior to transferring these depth pulses 7 on receiver output 9 to the depth logic 10 of FIG. 1.

Referring now again to FIG. 1, it will be noted that the depth logic 10 will operate upon the pulse information related to the depth of the sonde 2 contained in receiver output 9, and will process input data from other sources as well in a manner to be described hereinafter, so as to provide to depth controller 12 on output 11 all depth and logging rate information necessary for the proper operation of the well site system.

Assuming for purposes of illustration that no corrections to the depth pulse output 9 from receiver 8 is necessary, and that each pulse therefore accurately relates to a preselected incremental movement of the sonde 2 within the borehole. Accordingly, pulse output 9 will pass through adder-subtracter 199 on pulse line 190e to adder 203 by way of adder-subtracter output 199b. From adder 203, these pulses, which originated at pulse output 190b, will be delivered on adder output 203a to a conventional multiplexer 205, and from multiplexer 205, to a suitable depth counter 240 by means of a multiplexer output 205a.

Assuming the logging operation has commenced in a generally downward direction at an elevation of 0 feet, it will be appreciated that as depth counter 240 accumulates or counts pulses originating from adder 203, the pulse count contained in depth of the sonde 2 within the borehole because each pulse at pulse output 203a corresponds to a known movement of sheave wheel 4, which in turn, corresponds to a known movement of logging cable 3 and thus a known movement of the sonde 2. This accumulated count of depth pulses in depth counter 240 may be delivered on depth counter output 240a to a conventional visual display 80 to be used, for example, in monitoring the depth of the sonde 2. Alternatively, it will be noted from FIG. 3 that the depth information contained in depth counter 240 may also be delivered on output 11 to the controller 20 through depth controller 12 in response to interrogation demands from controller 20, for example, delivered to depth controller 12 on data/control signal 21. It will be noted that it may be desirable to preset the indication of depth contained in depth counter 240 to a preselected depth level. This may be useful, for example, when a particular logging operation is begun at a preselected depth within the borehole, and it is known from previously derived historical data that the present indication of depth on display 80 does not correlate with depth indications of this historical data. Accordingly, appropriate preset logic 206 may be provided which, in response to a preset input derived from master controller 20 through depth controller 12 on output 11 or, alternatively, in response to a manual preset signal 217a from a manual preset circuit 217b, will generate a preset logic output 206a which will preset depth counter 240 and the corresponding display 80 to the desired preselected depth. It will further be appreciated that because a logging operation may proceed in either a generally upward or downward direction within the borehole, a provision must be made for instructing depth controller 12 as to the direction of travel of the sonde 2 within the borehole. This is necessary in order for the depth counter 240 to sense whether to count and accumulate the pulses received on multiplexer output 205a, corresponding to movement of the sonde 2 downward within the borehole, or, alternatively, to decrement an existing count contained in depth counter 240 in response to the depth pulses on multiplexer output 205a, corresponding to movement of the sonde 2 in a generally upward direction. Accordingly, it will be seen from FIG. 3 that a suitable direction flip-flop 191 is provided for detecting from phase information contained in the pulse output 190b the direction of travel of the sonde 2. This directional information will be conveyed on flip-flop output 191a through multiplexer 205 to depth counter 240 on multiplexer output 205a, thus instructing depth counter 240 whether to add or subtract the pulse output information being received on multiplexer output 205a.

As hereinbefore noted, in addition to information related to the depth at which logging data has been generated, in logging operations it is often desirable to have available a suitable indication of the rate at which the logging operation is being conducted, or, more particularly, the rate at which the sonde 2 is traveling within the borehole. Accordingly, the depth pulse output information contained on multiplexer output 205a may be conveniently delivered to a suitable log rate counter 81 which will count the rate of arrival of these pulses per unit of time, and thereafter deliver on log rate counter output 81A the resulting logging rate for observation on display 82. It will also be recalled that it is a feature of the present invention to generate lithological measurements and the like in response to a control signal which may be functionally related to the depth of the sonde 2, and that it is accordingly necessary to generate a control signal at preselected depth intervals. Thus, it may be seen from FIG. 3 that a depth interrupt generator 219 is provided for receiving the depth pulses contained on multiplexer output 205a. This depth interrupt generator 219 will generate a control signal output 219a in response to receiving a preselected number of depth pulses on multiplexer output 205a. As hereinbefore noted, this control signal output 219a is routed on output 11 to the depth controller 12, and thereafter may be transferred to the master controller 20 and the sonde 2 for purposes herein described. It will be appreciated that the control signal output 219a from depth interrupt generator 219 may be adjusted in any desired fashion to provide a control signal output 219a at any preselected intervals of depth. This may be achieved, for example, by causing depth controller 12 to generate an appropriate depth/data control signal 21 in response to instructions from master controller 20 also on signal 21. It will further be noted that in response to interrogation commands from master controller 20 delivered to depth controller 12 on depth/data control signal 21 depth controller 12 may interrogate and receive appropriate information on output 11 from log rate counters 81, depth counter 240, and depth interrupt generator 219.

For further purposes of illustration it may now be assumed desirable to alter the number of depth pulses on pulse line 190e prior to their delivery on multiplexer output 205a to log rate counter 81, depth counter 240, and depth interrupt generator 219. More particularly, it will be assumed that it is desirable to add additional pulses to or subtract existing pulses from the depth pulses carried on pulse line 190e in a continuous manner for the duration of time over which these pulses from receiver output 9 are present. As hereinbefore noted, there are numerous reasons for desiring this feature. For example, it may be known that the circumference of the sheave wheel 4 has been reduced a predetermined amount due to frictional wear against the logging cable 3 such that the functional relationship between the distance between depth pulses generated by sheave wheel 4 on receiver output 190a and the travel of logging cable 3 over the sheave wheel 4 has changed and it is accordingly desired to compensate for this wear. It may also be desirable, for example, to subtract a preselected number of pulses from the depth pulses generated by the sheave wheel 4 in order to compensate for the fact that due to stretch of logging cable 3 while the sonde 2 is being withdrawn from the borehole, the number of depth pulses generated by the sheave wheel 4 which corresponds to the travel of the logging cable 3 over the sheave wheel 4 does not correlate with the travel of the sonde 2 within the borehole. Accordingly, the depth logic 10 may be provided with a continuous correction circuit 196, which will generate a number of depth correction pulses on output 196a for a predetermined number of depth pulses generated by sheave wheel 4 which are present on receiver output 9. For example, if one pulse at receiver output 9 corresponds to one foot of travel of the sonde 2, it may be desired to smoothly subtract one pulse from every one thousand pulses generated, corresponding to a cable stretch of one foot per one thousand feet of logging cable 3.

It will be further noted that these correction pulses 196a, will be delivered to conventional pulse shaper circuitry 200 and will thereafter be delivered on pulse shaper output 200a to adder-subtractor 199. A logic control 198 may also be provided which, in response to an appropriate correction switch 193 setting at no, will generate a logic control output 198a which will, in turn, cause adder-subtracter 199 to either make no corrections to the depth pulses contained on pulse line 198e, or will cause adder-subtracter 199 to add or subtract correction pulses on pulse shaper output 200a, respectively, to the depth pulses on pulse line 190e. After the appropriate addition or subtraction of pulses has occurred in adder-subtracter 199, the resulting depth pulse information, which has now been corrected as desired, will be passed on as hereinbefore explained on adder-subtracter output 199b for eventual display on displays 80 and 82, and the like, or in the alternative, will be passed on adder-subtracter output 199a to a yo-yo detector 202 which will hereinafter be explained in greater detail. It will be noted that in order for continuous correction circuit 196 to generate a preselected number of correction pulses in relation to another preselected number of depth pulses generated by sheave wheel 4 as previously noted, it is necessary to provide continuous circuit 196 with information related to the number of depth pulses being generated and the number of correction pulses desired. Accordingly, it will be seen from FIG. 3 that information relating to the number of correction pulses desired may be delivered to continuous correction circuit 196 by an appropriate output 194a of a depth correction switch, which has been set at the desired number of correction pulses. In like manner, information related to the number of depth pulses which are being generated by sheave wheel 4 is conveyed to continuous correction circuit 196 on input 196b. It will be appreciated that instant yo-yo correction circuitry 195, like continuous correction circuit 196, is generating correction pulses which will be added to or subtracted from the depth pulse information on pulse line 190e, in a manner to be hereinafter described so as to correct for yo-yo phenomenon, and the like, as previously noted. It will also be appreciated that these correction pulses generated by correction circuitry 195 and 196 must not interfere with each other in that they will be altering the same pulse information contained on pulse line 190e. Accordingly, continuous correction circuit 196 derives its necessary information related to production of depth pulses on input 196b from correction circuitry 195 so as to avoid generating correction pulses at the same time. However, it will be noted that correction circuit 196 is still receiving depth pulse information from receiver output 9 in that this information is being transferred on instantaneous correction input 190d to correction circuit 195 and thereafter is delivered on input 196b to continuous correction circuit 196.

Rather than adjust output 11 for a continuous and fixed amount of compensation for cable stretch, dimensional variations of the sheave wheel 4, and the like, as hereinbefore noted, it may also be desirable to adjust output 11 on an instantaneous dynamic basis at any point during a logging operation, so as to compensate for, as an example, the yo-yo phenomenon previously noted. Yet another example of when it may be desirable to provide this instantaneous compensation feature may occur during the merger of two or more sets of logging data taken at different time, wherein, during the logging operation, an erroneous depth offset is observed in the graphical display of these two sets of data. Referring first to the desirable feature wherein a preselected number of correction pulses may be added or subtracted to another preselected number of depth pulses at any desired time in response to a manual input, it will be seen from FIG. 3 that depth logic 10 may be provided with a correction switch 193 having a plurality of manual depth addition and depth subtraction settings. In functional response to these settings correction switch 193 will generate an output 193a causing instantaneous yo-yo correction circuitry 195 to generate a correlative preselected number of correction pulses on output 195b for every preselected number of depth pulses received by correction circuitry 195 on correction input 190d. It will be seen that correction circuitry 195 is provided with a reset counter 197. The purpose of counter 197 is to count the number of correction pulses generated by correction circuitry 195 which are presented on correction circuitry output 195b to reset counter 197. When the preselected number of correction pulses has been generated, reset counter 197 will generate a reset counter output 197b which will enable correction switch 193 to again respond to its addition or subtraction setting when further depth correction pulses are desired. Using the previous example, during the course of a logging operation it may be determined from a graphical display of logging data being received that depth indications of the data are in error and thus offset by five feet from their proper elevation. It may therefore be desirable to distribute this five foot correction over a 1,000 foot increment of future logging data to be received and will thus be desirable to generate five additional depth correction pulses to be added to the next 1,000 depth pulses generated by the sheave wheel 4. Accordingly, and in response to a depth addition input setting of correction switch 193 and the correlative correction switch output 193a, the instantaneous yo-yo correction circuitry 195 will begin monitoring on correction circuitry input 190d depth pulses, and will generate a depth correction pulse on its outputs 195b and 195a for every 200 depth pulses received on correction circuitry input 190d. When five of these depth correction pulses have been generated and counted by reset counter 197, reset counter output 197b will re-enable correction switch 193, thus indicating that the five foot depth offset has been corrected and the depth correction circuitry is again available for further corrections. It will be seen that the depth correction pulses present on output 195b are delivered to a pulse shaper circuit 200 and thereafter delivered as pulse shaper output 200a to the adder-subtracter 199 previously noted. It will further be noted that the depth addition and subtraction settings also provide an information signal (not shown) to logic control 198 such that logic control output 198a will instruct the adder-subtracter 199 to either add or subtract the pulses present at pulse shaper output 200a in response to whether a depth addition or depth subtraction setting was present at switch 193. It will also be noted that depth logic 10 may be conventionally arranged such that when a logging operation is proceeding downwardly through the borehole, depth pulses thus generated will be accumulated, whereas when a logging operation is proceeding upward from a preselected depth, generated depth pulses will be subtracted from a preselected number. It will thus be appreciated that adder-subtracter 199 must receive an indication of the direction of travel of the sonde 2 indicating depth correction pulses generated by correction circuitry 195-196 which are present on pulse shaper output 200a should be added to or subtracted from the depth pulses present on pulse line 190e. Accordingly, the logic control 198 is provided with a direction input 205c which receives on flip-flop output 191a information derived from direction flip-flop 191 indicating the direction of travel of the sonde 2. The logic control 198, in response to this information, will generate the appropriate logic control output 198a instructing the adder-subtracter 199 whether to add or subtract the pulse present on pulse shaper output 200a to the depth pulses on pulse line 190e.

Referring now to the correction of depth pulses for the yo-yo phenomonen previously described, for purposes of illustration it will first be noted that a type oscillation which may be encountered in a logging operation is one wherein as the sonde 2 is being raised from the borehole, there may be moments at which the sonde 2 will reverse direction and travel in a generally downward motion for a short depth interval prior to resuming its upward travel. Because the depth encoder 6 is receiving pulses from the sheave wheel 4 functionally related to movement of the sonde 2 regardless of the direction of its travel, it will be noted that it may be desirable to provide circuitry for detecting the point at which the sonde 2 has reversed direction so as to avoid erroneously adding depth pulses generated during the travel of the sonde 2 in the undesired direction. Moreover, it would further be desirable to provide circuitry for resuming the proper incrementing or decrementing of the depth counter 240, depending on the desired general direction of travel of the sonde 2, after the sonde 2 has resumed its travel in the desired direction precisely at the point at which it began traveling in the undesired direction. Accordingly, depth logic 10 is provided with a direction change detector 201 which, in response to flip-flop output 191a from direction flip-flop 191, which is carried to input 205b of direction change detector 201, will generate a detector output 201a which is transferred to yo-yo detector 202. Yo-yo detector 202 may be designed to provide an output 202b in response to an indication on detector output 201a that the direction of travel of the sonde 2 has changed. This yo-yo detector output 202b will then cause adder 203 to prevent any depth pulses contained on adder-subtracter output 199b or pulse shaper output 204a from pulse shaper 204 to be passed on for counting in depth counter 240.

It will be appreciated that there may be instances when it is not desirable for detector 202 to prevent passage of depth pulses through adder 203 in response to detector output 201a. For example, the sonde 2 may be volitionally caused to reverse directions so as to re-log a portion of the borehole. It will be further noted that a predetermined minimum time interval may be required during which the sonde 2 pauses at a depth interval prior to intentional direction reversal being effected. Thus yo-yo detector 202 may be provided with appropriate circuitry to inhibit its activation in response to a direction change output 201a unless, in addition to presence of such an output 201a, the sonde 2 has paused a preselected time interval before proceeding in the reversed direction. Yo-yo detector 202 may further be provided with an up-down counter which will begin incrementing and counting depth pulses present on yo-yo detector input 199a when a direction change indicated on detector output 201a has been received. When the sonde 2 again changes directions and begins moving in the desired direction, the detector output 201a will reflect this direction change and thus cause the up-down counter of yo-yo detector 202 to begin counting down from the last number accumulated in response to depth pulses present on yo-yo detector input 199a. When the up-down counter of yo-yo detector 202 has reached zero, this indicates that the sonde 2 is now located at the point at which it changed direction of travel and began traveling in the undesired direction. Accordingly, when the up-down counter of yo-yo detector 202 reaches zero, a yo-yo detector output 202b will be generated activating adder 203 so as to re-enable the adder 203 to begin passing depth pulses on its output 203a to the depth counter 240 for proper incrementing or decrementing, as hereinbefore described. Thus, in summary, it will be noted that direction change detector 201 and yo-yo detector 202 provide the function of determining when the sonde 2 has begun oscillating in an undesired direction from being passed on for counting. Detectors 201-202 provide the further function of allowing depth pulses to be passed on for counting at the moment the sonde 2 has returned to the point at which it began moving in the undesired direction and has now resumed movement in the desired direction. It will thus be appreciated that yo-yo detector 202 broadly serves the purpose of filtering out depth pulses generated while the sonde 2 has oscillated from a detected point within the borehole.

It will be noted that yo-yo detector 202 may be designed such that if the sonde 2 excursion after a direction change exceeds a predetermined distance, corresponding to the up-down counter of the yo-yo detector 202 exceeding a preselected number, detector 202 will be reset to zero and the adder 203 will nevertheless be enabled, allowing depth pulses to continue to be passed on to the depth counter 240. In such a case, it may further be desirable to generate depth correction pulses to replace depth pulses which were not permitted to pass through adder 203 while the up-down counter of yo-yo detector 202 was counting. Accordingly, yo-yo detector 22 may be provided with a yo-yo detector output 202a which will activate corrections switch 123 in like manner to activation caused by depth addition and subtraction input settings of switch 193 respectively. Correction switch output 193a from correction switch 193, generated in response to yo-yo detector output 202a, will activate instantaneous yo-yo correction circuitry 195 which, in turn, will generate the appropriate depth correction pulses in a manner similar to generation of depth correction pulses caused by the switch 193 settings. These depth correction pulses appearing on correction circuitry output 195a will thereafter be delivered to conventional pulse shaper circuitry 204, the output 204a of which will cause the adder 203 to add the thus generated depth correction pulses to the depth pulses on the adder output 199b.

Figure 4:
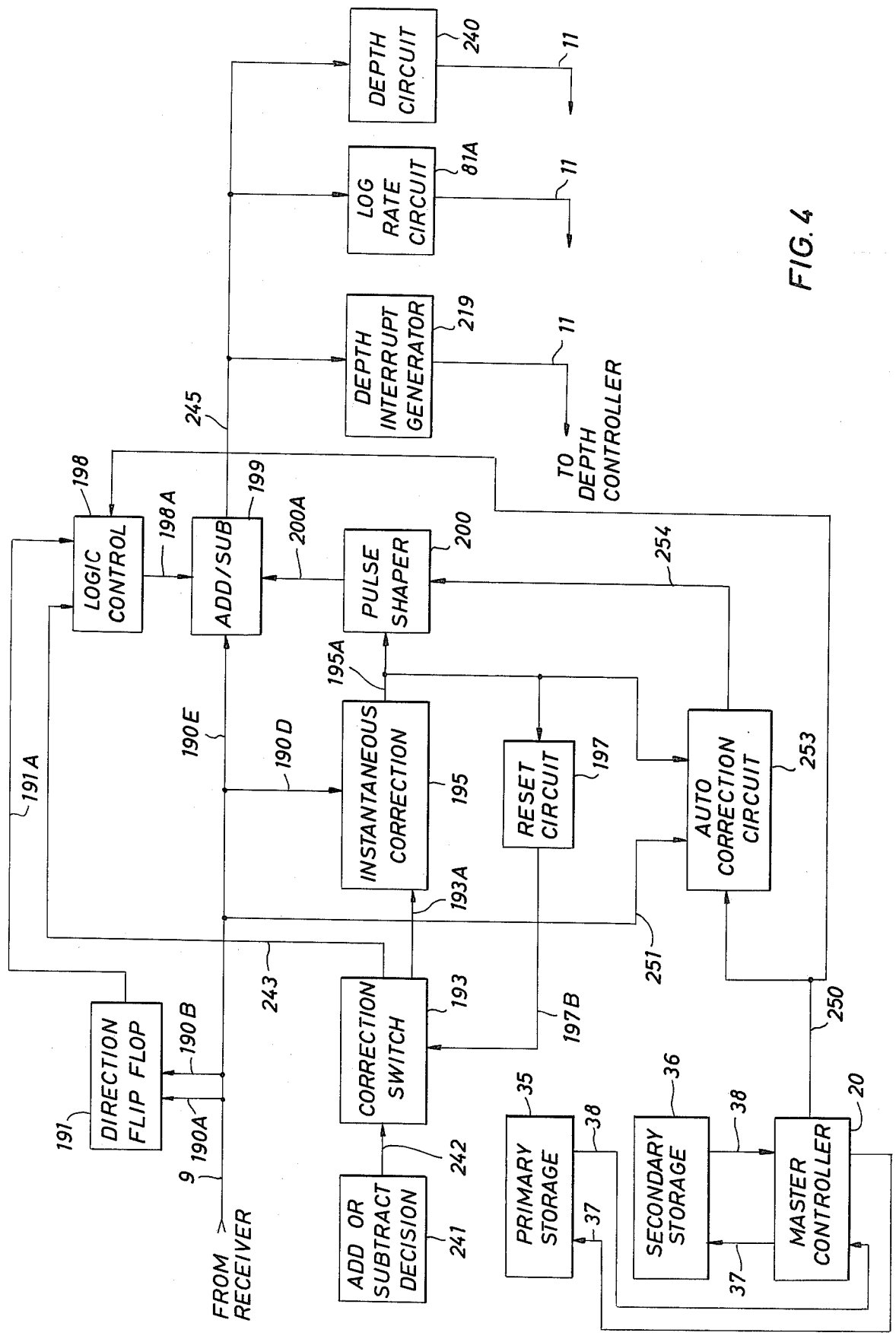
FIG. 4 is another functional representation of an alternate embodiment of the depth logic depicted in the present invention in FIG. 1.
Figure 1:
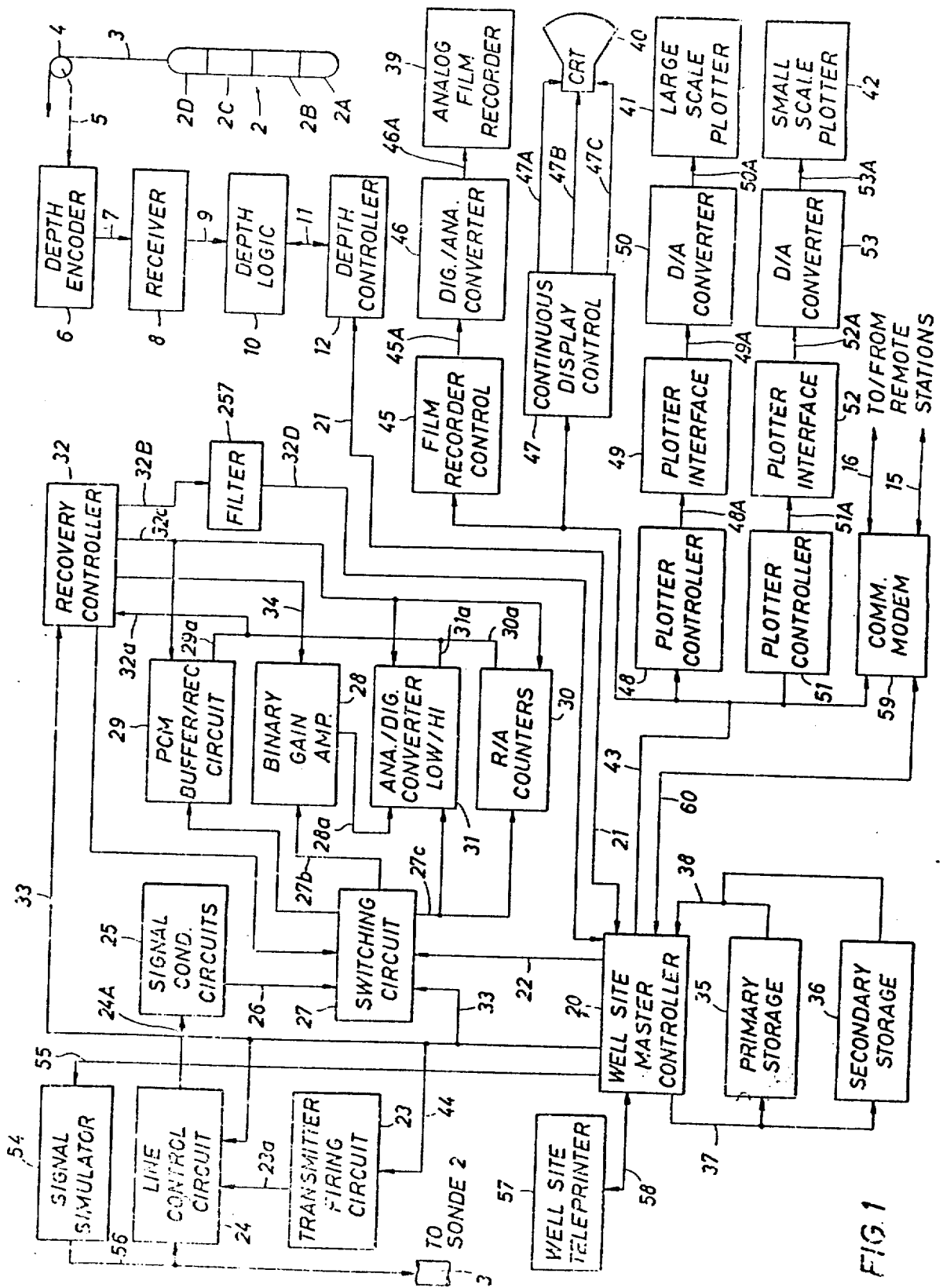
Figure 3:
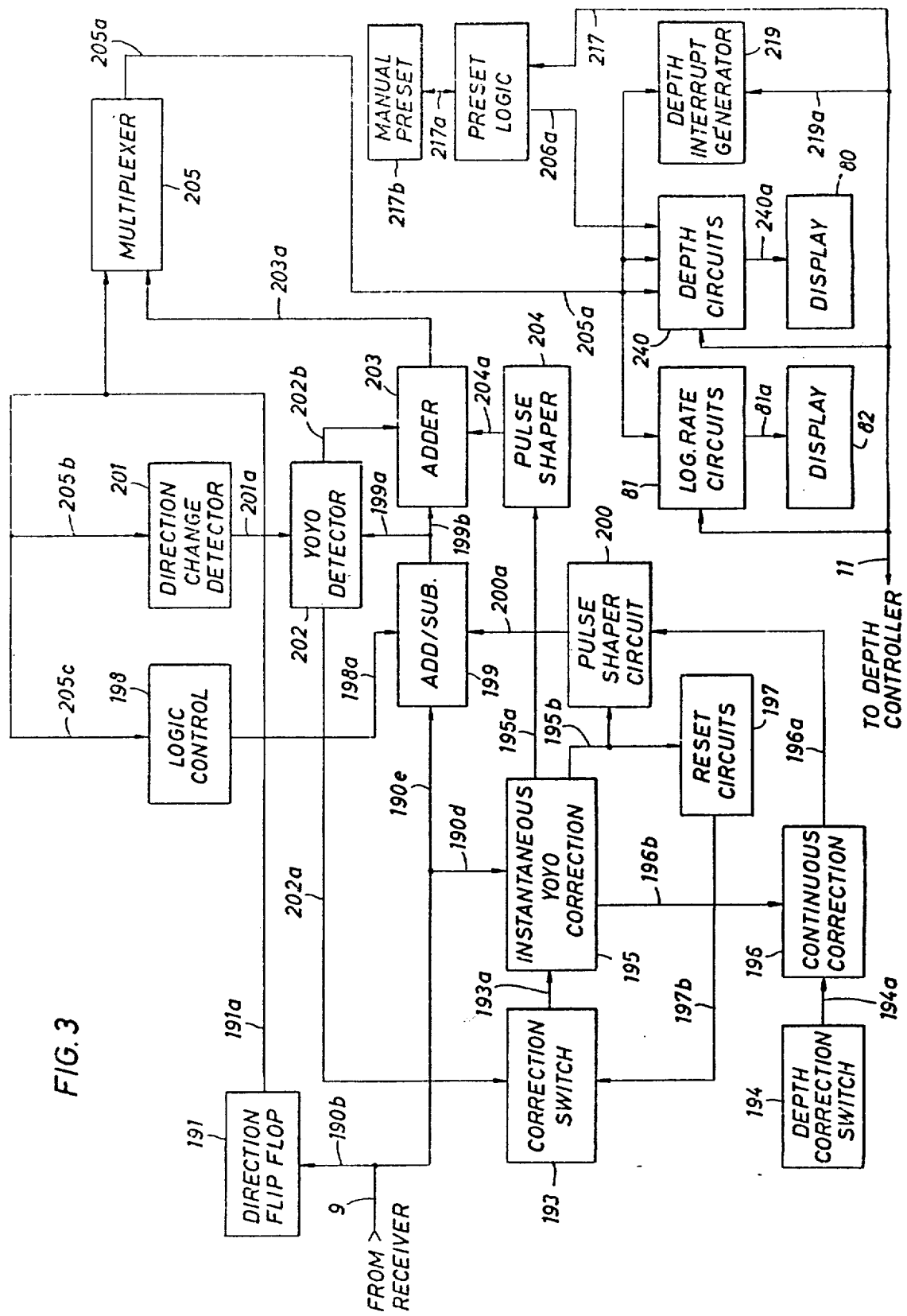

Referring now to FIG. 4, there will be seen an embodiment of the present invention depicting a more detailed functional representation of the manner of operation of the present invention particularly when in an "auto-correlation" mode to be hereinafter described in greater detail. For purposes of illustration, it will be assumed that the logging operation has begun in the downward direction, wherein as the sonde 2 progresses deeper into the borehole, measurements will be generated by the sonde 2 at depth intervals functionally related to the control signal 21 from the depth controller 12. It will be recalled that the depth encoder 6 preferably generates a depth measurement signal 7 in the form of pulses, wherein each pulse corresponds to a preselected angular displacement of the sheave wheel 4. If it is assumed that each such displacement corresponds to a correlative length of travel of the logging cable 3 over the wheel 4, and that this travel in turn corresponds to a correlative movement of the sonde 2, it will be appreciated that the signal 7 from the depth encoder 6 may be used to detect the depth of the sonde 2 within the borehole. Moreover, it will be seen that the depth information carried by the signal 7 may further be used to generate control signals 21 functionally related thereto, which, when delivered to the sonde 2, may cause the sonde 2 to generate measurements at any preselected depth interval. However, it will be further recalled that due to the well-known phenomenon such as stretch of the log cable 3 or slippage of the log cable 3 over the sheave wheel 4 and the like, the depth pulses generated by the encoder 6 may not correspond exactly to the travel of the sonde 2 within the borehole. Moreover, even if they do so correspond, it may be desirable to vary in a preselected fashion these depth pulses from the encoder 6 so as to correspondingly vary the command signals 21 generated in response thereto. It will be appreciated that this, in turn, will allow variable control over the depth increments at which the measurements of the sonde 2 are taken. One reason for doing this, for example, may be to regulate the depth at which future measurements are taken by the sonde 2 so as to correspond to the depth at which historical measurements were taken.

It will be noted that these historical measurements may have been taken at varying depth increments due to the hereinbefore noted cable stretch phenomenon and the like. It would therefore be highly desirable to insure that each real time measurement was generated at a depth correlative to its historical counterpart so as to enable verification of accuracy and integrity of the latter derived data, to enable combination of these two sets of data in functional relationships, and the like.

In the present illustration, as noted, it will be assumed that the sonde 2 is proceeding in a downward direction generating measurements in response to the control signal 21. It will also be assumed that such measurements are being visually displayed on the CRT 40, together with the indications of depth at which they were derived, in a manner previously described in copending U.S. patent application Ser. No. 949,592, filed Oct. 10, 1978. Moreover, it will further be assumed that alongside each such measurement, a correlative historical measurement of an identical logging parameter for example, such as the spontaneous potential measurement well known in the logging art, and which was assumed to have been derived at identical depth and identical depth increments is being is being displayed. Due to the graphical visual display on the CRT, it may, for example, be determined from an inspection of the display that there is a depth "offset" between the two curves. More particularly, from an identifiable similar appearing perturbation in both curves, it may be seen that the perturbation does not occur in the same horizontal plane on the display, but rather the real time data of the perturbation appears to have been generated, for purposes of illustration, at a depth increment one-half foot shallower than the correlative historical measurement. Accordingly, it would be desirable to adjust the depth increments at which the later real time measurements are being made so as to bring the two curves into horizontal alignment. Because the historical measurements appear to have been generated one-half foot deeper within the borehole than each correlative real time measurement, it should be apparent that it would be desirable to cause successive real time measurements to be generated at larger depth increments than previously as the sonde 2 continues its travel down the borehole, until it appears that the real time and historical measurements at identically indicated depths correlate in magnitude, thus indicating that they were derived at identical depths.

It will be seen from FIG. 4 that a receiver output 9 has been provided which preferably comprises a series of pulses, each occurrence of which corresponds to a pre-selected angular rotation of the sheave wheel 4. In the present example, it will be assumed, for purposes of illustration, that the circumference of the sheave wheel 4 has been selected so that for every complete rotation thereof, 256 pulses are generated, corresponding to travel of one foot of the logging cable 3 over the sheave wheel 4. Moreover, it will be assumed that upon occurrence of every 256th pulse, the depth logic 10 will be designed so as to generate an output 11, so as to cause the depth controller 12 to generate a control signal 21 which, in turn, will cause the sonde 2 to generate a next real time sample. Thus, it will be appreciated, that, assuming a one-to-one correspondence to such travel of the log cable 3 over the sheave wheel 4, and a correlative vertical movement of the sonde 2 down the borehole, the sonde 2 will thus be caused to generate a measurement at every foot of traversal through the borehole. It will be appreciated that by adding or subtracting five additional pulses to or from each train of 256 pulses normally incoming on the receiver output 9, and continuing to use every 256th pulse after such correction to generate a next real time sample from the sonde 2 in response to the command signal 21, the net effect will be to cause such a sample to have been generated at a depth increment of 251/256ths or 261/256ths of a foot respectively deeper than the prior measurement. Thus, by so adding or subtracting such correction pulses, depth offsets of plus or minus 5/256 or approximately plus or minus 1/50th of a foot per foot may thus be corrected. Moreover, if such correction was consistently introduced successively 25 times for each incoming train of 256 pulses, a depth offset between the real time and historical curves of one-half foot may thus be smoothly corrected over a 25 foot interval.

Referring now more particularly to FIG. 4, it will be seen that such an uncorrected pulse train wherein a pulse is generated from every 360/256 ths of a degree of rotation of the sheave wheel may be delivered from the receiver output 9 on the pulse outputs 190a and 190b to a direction flip-flop 191. Such pulses may also be delivered on pulse line 190e to a conventional adder/subtracter 199 and as correction input 190d to the instantaneous correction circuitry 195, for purposes to be hereinafter described. Referring particularly to the pulse outputs 190a and 190b, it will be appreciated that if the occurrence of a pulse only corresponds to angular rotation of the sheave wheel for a preselected amount independently of its direction of travel, a means must be provided for knowing whether to subtract or add such pulses to previously occurring pulses in functional relation to the direction of travel of the sonde 2. For example, in the present illustration, if it is assumed that the sonde 2 has travelled downward a distance of 100/256 ths of a foot down the borehole, 100 such pulses will have been delivered on the receiver output 9. However, without a directional indication as to the direction of travel of the sonde 2 upon the next receipt of such a pulse, there will be no basis for determining whether such a pulse should be added or subtracted to the existing count of 100. One method for accomplishing this feature is to provide the sheave wheel 4 with an encoding wheel well known in the art which provides two sets of such pulses wherein they are offset by a known phase difference correlative to the points on the encoding wheel from which they were generated. By detecting the phase difference between any such pulse from one pulse set delivered on the pulse output 190a with the correlative pulse from the other set delivered on the pulse output 190b, the direction of travel of the sonde 2 may thus be detected by the direction flip-flop 191. It will be seen that this directional information will be delivered on the flip-flop output 191a to the logic control 198. The logic control 198 will, in turn, generate a logic control output 198a so as to cause correction pulses on the pulse shaper output 200a to be either added or subtracted to the pulses on the pulse line 190e delivered to the adder/subtracter 199 in response to inputs to the logic control 198 which are the flip-flop 191a and the correction output 243. It will be noted that a change in signal from either the flip-flop output 191a or the correction output 243 will cause the logic control output 198a to change so as to cause the adder/subtracter 199 to perform the arithmetic operation opposite to that it was performing prior to such a change in the correction output 243 or the flip-flop 191a. For purposes of the present illustration, it will be assumed that the sonde 2 is continuing in a generally downward direction, wherein the flip-flop output 191a remains constant, thus indicating to the logic control 198 that the direction of travel of the sonde 2 is downward. As previously indicated, in the present illustration, it has been determined that the one-half foot depth offset between the historical and real time logging curves is such that it is desirable to derive subsequent real time measurements at larger depth increments within the borehole. As previously noted, this corresponds to the desirability of subtracting five depth pulses from the pulse train of every 256 pulses delivered on the receiver output 9. Accordingly, it will be seen from FIG. 4 that this decision may be functionally represented as the "add or subtract depth" decision 241 which may conveniently correspond to the manual switch setting 242 of a correction switch 193. It will be seen that in response to the switch setting 242, the correction switch 193 will preferably deliver a correction output 243 to the hereinbefore noted logic control 198. Thus, the logic control has been instructed by occurrence of the flip-flop output 191a and the subtract decision carried on the correction output 243 to generate a log control output 198a so as to cause the adder/subtracter 199 to subtract incoming correction pulses from a pulse shaper output 200a to the incoming pulse train on the pulse line 190e. As hereinbefore noted, if the decision had been to derive future real time measurements at smaller increments within the borehole, corresponding to the setting of the correction switch 193 in response to an add decision 241, the correlative correction output 243, assuming the sonde 2 is still travelling in a downward direction, would conversely cause the logic control 198 to generate a logic control output 198a so as to cause the adder/subtracter 199 to operate in the add mode. In this mode, pulses received on the pulse shaper output 200a would accordingly be added to from the incoming pulse train of 256 pulses on the pulse line 190e. Referring again to FIG. 4, it will be noted that an instantaneous correction circuit 195 has been provided. It will be noted that the correction circuit 195 is provided with a correction input 190d which comprises the incoming pulse train of 256 pulses per foot of travel of the logging cable over the sheave wheel 4. In response to the correction output 193a, the correction circuitry 195 will preferably count the number of pulses being delivered on the correction input 190d. Each time the count reaches 256 and begins again at 1, when a correction output 193a has been received, the instantaneous correction circuit 195 will generate five correction pulses which will be delivered on the correction circuitry 195a to a conventional pulse shaper 200, and thereafter be delivered on the pulse shaper output 200a to the adder/subtracter 199. Depending upon the setting of the adder/subtracter 199 in response to the logic control output 198a, as previously noted, these five pulses will either be added or subtracted to the next incoming sequence of 256 pulses on the pulse line 190e. Accordingly, the number of pulses which normally would have occurred in response to a complete rotation of the sheave wheel 4 will have been either incremented or decremented by 5 as they will now appear on the pulse output 245 in response to the correlative condition of the logic control output 198a. For example, in the present illustration wherein it was decided to derive subsequent real time measurements over larger increments of borehole depth in response to the visual display on the CRT 40, the setting of the correction switch 193 accordingly caused the logic control output 198a to set the adder/subtracter 199 in the subtract mode. Upon activation of the correction switch 193, the instantaneous correction circuitry 195, in response to the correction output 193a, delivered five correction pulses on the pulse output 195a through the pulse shaper 200 to the adder/subtracter 199 on the pulse shaper output 200a. Due to the correction output 243, the adder/subtracter 199 has been set in the subtract mode, wherein these five pulses will cause the removal of five pulses from the next incoming number of 256 pulses of the pulse line 190e. Accordingly, although 256 pulses are received by the adder/subtracter 199, during a correlative period of time, only 251 such pulses are delivered on the pulse output 245. Referring again more particularly to FIG. 4, there will be seen a depth circuit 240 to which these pulses on the pulse output 245 are preferably delivered. The depth circuit will preferably retain a cumulative count of such pulses on the pulse output 245. Moreover, the depth circuit 240 will also preferably translate such a cumulative count to a correlative visual and digital indication of depth. This digital depth indication may be delivered on the depth logic output 11 to the depth controller 12. It will now be apparent that the operation of the present invention is to variably adjust in a preselected fashion the number of pulses generated by and correlative to the angular rotation of the sheave wheel 4, such pulses prior to adjustment being present on the receiver output 9. In this manner, the add or subtract decision 241 is altering in a preselected fashion the number of depth pulses on the receiver output 9 generated per known angular movement of the sheave wheel 4. These adjusted pulses, which appear on the pulse output 245 may be accumulated as hereinbefore described by the depth circuit 240, so as to generate a signal correlative to the depth of the sonde 2 which has been adjusted or compensated by the add or subtract decision 241. Still further, there will be seen in FIG. 4 a log rate circuit 81a, the purpose of which is to count the number of such adjusted pulses on the pulse output 245 which have been received per unit of time. It will be appreciated that such a count without such corrective addition or subtraction of pulses from the sheave wheel 4, would normally correspond to the angular rate of movement of the sheave wheel 4, which, in turn, would presumably correlate with the vertical rate of movement of the sonde 2. However, it will be appreciated that by adjusting in response to the add or subtract decision 241 the number of pulses from the sheave wheel 4 which will be counted per unit of time, the net effect is to adjust the apparent logging rate of the sonde 2 so as to correlate with that of the sonde movements during generation of the historical data. It will be further noted that a depth interrupt generator 219 is preferably provided. The purpose of the generator 219 is to generate a signal on the depth logic output 11 to be delivered to the depth controller 12 correlative to a preselected number of pulses to be received by the interrupt generator 219 on the pulse output 245. In the present illustration, each time the generator 219 receives 256 pulses on the pulse output 245, a signal will thus be generated and delivered on the interrupt generator output 11 to the depth controller 12. As previously described, and in response to the interrupt generator output 11, the depth controller 12 will thereafter generate command signals 21 so as to cause generation of a next real time measurement in the sonde 2 in response thereto. Thus, it will be seen that by adjusting the incoming pulses on the pulse line 190e in response to the add or subtract decision 241, the net result is to adjust the length of travel of the sonde 2 subsequent to a generation of a sample before a next such sample will be taken by the sonde 2 in response to the interrupt generator output 11. It will be seen from FIG. 4 that a reset circuit 197 has been provided. The reset circuit 197 will preferably be adjusted so as to deliver a reset output 197b to the correction switch 193 when 25 sets of five correction pulses each have been received by the reset circuit 197 on the pulse output 195a. Upon receipt of the reset output 197b by the correction switch 193, the correction switch 193 will be disabled such that no correction 193a is thereafter presented to the instantaneous correction circuit 195 until the correction switch 193 receives a next switch setting 242 corresponding to an add or subtract decision 241. Thus it will be seen that in response to each activation of the correction switch 193 by the switch setting 242, a total of 25 ft. × 1/50 ft./ft. or ½ ft. correction over a 25 ft. interval may be achieved.

In the previous illustration, the decision to add or subtract correction pulses to the pulse train from the receiver output 9 was made visually and in response to a manual input. It should be apparent, however, that means may be provided for automatically comparing measurements from two sets of logging data which were assumed to have been derived at the same elevation within the borehole, and thereafter generating an automatic correction to the pulse train of the receiver output 9 in response to such comparison. Moreover, it will be appreciated that these two sets of logging data may correspond to two historically derived sets of logging data, or may even involve comparison of real time measurements as they are being generated with measurements from a historical set of data correlatively derived at functionally related depths. In the latter case, it will be appreciated that means have been provided for automatically causing real time measurements to be made by the sonde 2 correlative to depths at which historically derived logging measurements were made.

Referring to FIG. 4, it will be recalled that the well logging system of the present invention is preferably provided with a primary and secondary storage 35 and 36, which may be used to store additional real time data as it is being derived as well as for storing and retrieving historical data, respectively. Moreover, it will be appreciated that the master controller 20 may suitably be designed to retrieve historical measurements which were derived at a plurality of depths within the borehole on the storage output 38 in response to an input signal 37 from the master controller 20. In like manner, the master controller 20 may further be adapted so as to retrieve for further processing from the primary storage 35 on the storage output 38 in response to the input 37, real time measurements as they are derived by the sonde 2 as well as historical measurements from a logging run different from that stored in the secondary storage 36, which may also alternatively be stored in the primary storage 35. As previously indicated, the master controller 20 may preferably retrieve any such samples stored in the primary and secondary storage 35 and 36. Accordingly, it will be appreciated that the master controller 20 may retrieve from the primary storage 35 one or more samples derived at known depth intervals with one or more samples stored in the secondary storage 36 which were derived at depths correlative to those retrieved from the primary storage 35. A functional comparison of the samples retrieved from the primary and secondary storage 35 and 36 may thus be made. Due to the processing capability of the controller 20, such a functional comparison may be extremely sophisticated, or, for purposes of illustration in the present example, the comparison between two sample points may be as simple as to merely note the apparent depth offset between peaks of two apparently identical perturbations appearing on the CRT 40. Each time the master controller 20 detects that an adjustment of the depth pulses from the receiver output 9 is required from such a comparison a correction signal 250 will preferably be delivered from the master controller 20 to an appropriate auto-correction circuit 253. It will be noted from FIG. 4 that the auto-correction circuit 253 will also receive a pulse input signal 251 correlative to the correction input signal 190d delivered to the instantaneous correction circuit 195. This pulse input 251 will be comprised of the train of pulses from the receiver output 9, correlative to the train of pulses delivered on the correction input 190d to the instantaneous correction circuit 195. In like manner to the operation of the instantaneous correction circuit 195, the auto-correction circuit 253 will generate correction output 254 correlative to the pulse output 195a of the instantaneous correction circuit 195 each time the auto-correction circuit 253 is activated by the correction signal 250. In like manner to the correction pulses generated by the correction circuit 195, the auto-correction circuit 253 will generate preferably a preselected number of correction pulses in response to another preselected number of pulses on the pulse input 251. In the present example, in like manner to the instantaneous correction circuit 195, for example, the auto-correction circuit 253 will preferably generate five correction pulses on the correction output 254 in response to 256 incoming pulses on the pulse input 251. Also in like manner to the manual correction of depth pulses, it will be seen that the correction signal 250 from the master controller 20 is also preferably delivered to the logic control 198 so as to cause the logic control 198 to generate an appropriate log control output 198a in response thereto to determine whether the adder/subtracter 199 will be operating in the add or subtract mode. The correction output 254, after being conventionally shaped in the pulse shaper 200, will be delivered as pulse shaper output 200a to the adder/subtracter circuit 199. Also in like manner to the manual operation of the apparatus of FIG. 4, the logic control output 198a will cause the adder/subtracter 199 to either add or subtract five such pulses comprising the pulse shaper output 200a to the incoming pulse train of 256 depth pulses on the pulse line 190e. It will be noted that the auto-correction circuit 253 may further be provided with a pulse output 195a from the instantaneous correction circuit 195. The reason for this is to prevent generation of correction pulses by the auto-correction circuit 253 at a time when such correction pulses have been also generated by the instantaneous correction circuit 195, for the reason that this will permit the adder/subtracter 199 to either add or subtract pulses from both the pulse output 195a and the correction output 254 without treating simultaneously occurring pulses from both sources as only one pulse.

Referring again to FIG. 1, there will be seen a filter 257 having an input from the recovery controller output 32b and a filter output 32d which is delivered to the master controller 20. In the correlation of two sets of logging data it is conventional practice to insure that an identical parameter is measured during each pass through the borehole concurrently with other parameters which may be of interest. The reason for this is that it is frequently easier to compare measurements of the same parameter generated at different times to determine if they were derived at the same depth within the borehole. This, in turn, is often beneficial because if any two curves or sets of data generated at different times may be correlatively matched with respect to depth, then any other such parameters or curves which were derived simultaneously during the same passes through the borehole and at the same depth increments will therefore be also correlatively matched with respect to depth. Two such measurements which have been found suitable for correlatively matching with respect to depth measurements from two or more sets of data derived during two or more passes through the borehole are the spontaneous potential and gamma ray measurements well known in the art. One problem which has occurred in the art with such measurements is that frequently they will be obscured by noise signals, as will other portions of the measured curve, so as to render them either unusable or inherently unreliable for correlation purposes in correlatively matching two sets of logging data with respect to the same depth. Thus, the present invention contemplates insertion of a filter 257 which will filter out noise present on the recovery controller output 32b so as to cause a filter output 32d to be delivered to the master controller 20 which is particularly free of noise, and consequently provides indications of parameter measurements which are more useful for correlation purposes in achieving more accurate correlation of logging data samples.

Many modifications and variations besides those specifically mentioned may be made in the techniques and structures described herein and depicted in the accompanying drawings without departng substantially from the concept of the present invention. Accordingly, it should be clearly understood that the forms of the invention described and illustrated herein are exemplary only, and are not intended as limitations on the scope of the present invention.

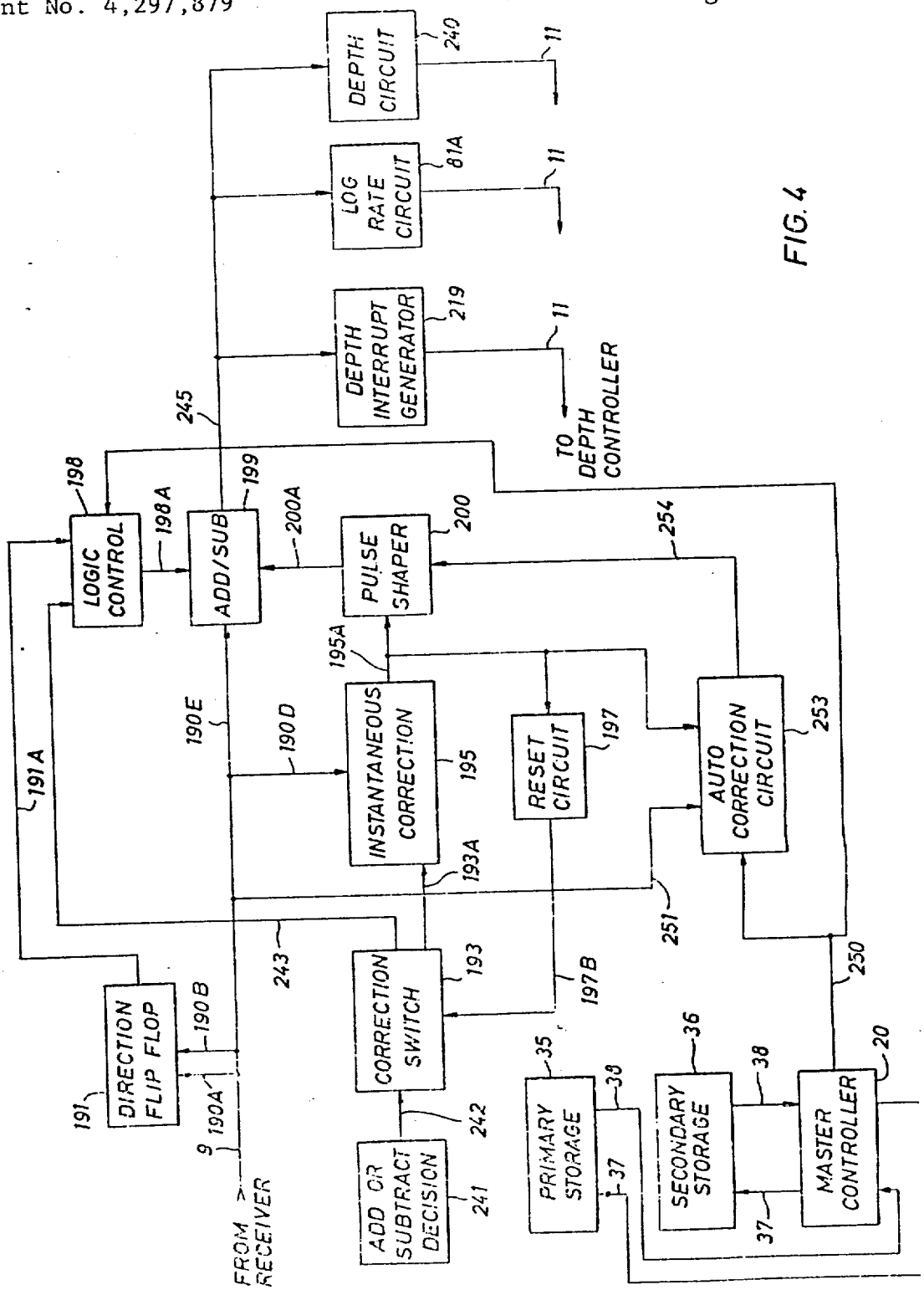

What is claimed is:

1. Apparatus for investigating the character of subsurface earth materials and the like traversed by a borehole, comprising
   command signal means for deriving an electrical command signal as a function of borehole depth,
   first signal means for deriving a first electrical measurement of said earth materials in response to said command signal,
   second signal means for deriving a second electrical measurement of said earth materials, and
   adjustment means for adjusting said command signal in functional relation with said first and second measurements.

2. The apparatus of claim 1, further comprising
   generating means for generating indications of depth functionally related to said first and second measurements, and
   correlating means for adjusting said command signal in correlation with said indications of depth.

3. The apparatus of claim 2 wherein said first and second signal means further comprise first and second measurement means for respectively measuring an identical earth parameter.

4. The apparatus of claim 3, wherein said generating means further comprises
   means for generating a first indication of borehole depth functionally related to the depth in said borehole at which said first electrical measurement was derived, and
   means for generating a second indication of borehole depth functionally related to the depth in said borehole at which said second electrical measurement was derived.

5. The apparatus of claim 4, further including means for correlating said electrical measurements in functional relationship with at least one of said indications of borehole depth.

6. The apparatus of claim 5, further including
   means for selecting and comparing portions of said correlated electrical measurements as a function of said first and second indications of borehole depth, and
   means for adjusting said command signal as a function of said comparison of said measurements.

7. The apparatus of claim 6 further comprising display means for displaying said first and second indications in spatial relation to indications of depth, and wherein said adjustment means further comprises
   means for deriving said adjustment signal as a function of said spatial relation.

8. The apparatus of claim 7 wherein said command signal means further comprises means for deriving said command signal as a function of discrete borehole depths.

9. The apparatus of claim 8 further comprising means for deriving a third electrical measurement of said earth materials as a function of said adjusted command signal.

10. The apparatus of claim 9, further including
    recording means for recording said first and second measurements prior to adjusting said command signal.

11. The apparatus of claim 10, further comprising
    display means for displaying said first and second measurements prior to adjusting said command signal.

12. The apparatus of claim 11, wherein said display means further comprises
    means for graphically and visually displaying said first and second measurements.

13. The apparatus of claim 12 wherein said first signal means further comprises first sampling means for sampling said first measurements, as a function of depth, and wherein said second signal means further comprises second sampling means for sampling said second measurements as a function of depth.

14. The apparatus of claim 13, wherein said first and second signal means further comprise, respectively, means for generating said first and second measurements as a function of depth.

15. Apparatus for investigation lithological characteristics of subsurface earth materials traversed by a borehole, comprising,
    first conversion means for deriving a first digital measurement in real time of a selected characteristic of said materials,
    second conversion means for deriving a second digital measurement of a selected characteristic of said materials on an historical basis,
    display means for electrically displaying a visual representation of said first and second digital measurements on a real time basis in functional correlation with borehole depth,
    sampling means for activating said first conversion means progressively along the length of said borehole,
    generator means for generating a visual representation of a correlative fixed increment of the length of said borehole,
    coupling means for coupling said generator means and said first and second conversion means to said display means,
    first selector means for selecting a portion of said displayed second measurement,
    first correlation means for electrically correlating said selected portion of said second measurement with the correlative portion of said displayed first measurement,
    measuring means for deriving an electrical representation of the magnitude of any displacement between said portions of said measurements with respect to said increment of borehole depth, and
    second correlation means for correlating said portion of said second measurement with said portion of said first measurement as a function of said magnitude of said displacement.

16. The apparatus described in claim 15, further comprising
    second selector means for electrically selecting a plurality of other portions of said second measurement in functional relationship to said magnitude of displacement, and
    sequencing means for sequentially displaying each of said other portions in conjunction with said displayed increment of the length of said borehole within a discrete time interval.

17. The apparatus described in claim 16 including timing means for visually displaying said other portions in sequence with a preselected discrete time interval for correlating said first and second measurements with respect to said increment of the length of said borehole within said time interval.

18. The apparatus described in claim 17 further comprising first recording means for recording said first measurement on a real time basis, second recording means for recording said second measurement in functional relationship with said recorded first measurement.

19. Apparatus for investigating the character of subsurface earth materials and the like traversed by a borehole, comprising command means for deriving an electrical command signal as a function of depth in said borehole, first signal means for deriving a first electrical measurement of said earth materials in response to said command signal, second signal means for deriving a second electrical measurement of said earth materials, recording means for correlatively recording said first and second measurement signals as a function of said command signal, coupling means for recording on said recording means said second measurement together with an indication of borehole depth and said first measurement in combination with said second measurement and in functional response to said command signal, and correlating means for correlating said command signal with said second measurement signal.

20. The apparatus described in claim 19 further including means for correlating said command signal with said second measurement signal while recording said first measurement signal in functional response to said command signal.

21. The apparatus described in claim 20 further including adjustment means for incrementally adjusting said command signal to record said first measurement signal in correlation with said second measurement signal and said depth indication.

22. Apparatus for surveying subsurface earth materials and the like traversed by a borehole, comprising first measuring means for progressively measuring a selected characteristic of said earth materials along a portion of the length of said borehole, command signal means for generating an electrical command signal composed of a sequence of pulses functionally indicative of and related to different selected depths in and along said portion of said borehole, first generating means for generating in response to said command signal pulses a first electrical data signal functionally related to digital representations of said measured characteristic of said earth materials at correlative ones of said different selected depths in said portion of said borehole, second generating means for generating in functional relationship to said command signal pulses a second electrical data signal composed of digital representations of a measured characteristic of said earth materials at a sequence of functionally correlative depths in said borehole, depth indication means for generating an electrical indication of the depth in said borehole to which said representations composing said first data signal are related, display means for deriving a correlative visible display of said first and second data signals and said electrical depth indications, adjustment means for incrementally adjusting said command signal as a function of any determined difference between said representations composing said first and second data signals in said indication of said depth in said borehole, and recording means for correlatively recording said first and second data signals in functional relationship with said incrementally adjusted command signal.

23. Apparatus for investigating the lithological characteristics of subsurface earth materials traversed by a borehole, comprising first measurement means for deriving a first digital measurement of a selected characteristic of said materials, first display means for electrically displaying a visual representation of said first digital measurement on a real time basis and in functional correlation with borehole depth, second measurement means for deriving a second digital measurement of a selected characteristic of said materials on a historical basis, and second display means for electrically displaying a visual representation of said digital measurement in functional correlation with said visual representation of said first digital measurement.

24. The apparatus described in claim 23, including means for deriving said first measurement progressively along the length of said borehole, first coupling means for electrically displaying on said first and second display means said first measurement together with a visual representation of a correlative fixed increment of the length of said borehole, and for electrically displaying said second measurement in correlation with said increment of the length of said borehole.

25. The apparatus of claim 24 including selection means for selecting a portion of said displayed second measurement, and first correlation means for electrically correlating said selected portion of said second measurement with the correlative portion of said displayed first measurement.

26. The apparatus described in claim 25 further including displacement magnitude detection means for deriving an electrical representation of the magnitude of any displacement between said portions of said measurements with respect to said increment of borehole depth, and second correlation means for correlating said portion of said second measurement with said portion of said first measurement as a function of said magnitude of said displacement.

27. Apparatus for deriving indications of depth of a logging tool within a borehole, comprising sensing means for progressively sensing at least one characteristic of said materials along a selected portion of the length of said borehole, signal generator means for progressively deriving an electrical logging signal in functional response to said sensed characteristic of said materials along said portion of said borehole, depth signal means for generating an electrical depth signal composed of marker pulses each indicative of an apparent sequential increment of the length of said borehole along said selected portion thereof, counter means for progressively counting said marker pulses in correlation with said logging signal, and depth indicator means for deriving a total of said marker pulses as an indication of the apparent borehole depth at which the correlative portion of said logging signal is derived.

28. The apparatus described in claim 27 further comprising, direction control means for deriving a direction control signal functionally indicative of the direction in which said earth characteristics is sensed along said borehole, and first total count means for progressively counting and totalling said marker pulses in functional correlation with said direction control signal.

29. The apparatus described in claim 28 wherein said direction control means further includes means for deriving said control signal on a time dependent basis.

30. The apparatus described in claim 29 further comprising supplementary pulse generator means for generating supplementary pulses as a predetermined function of said derived total number of said marker pulses, and second total count means for deriving the total of said supplementary pulses and said total marker pulses as an indication of the true depth in said borehole at which said correlative portion of said logging signal is derived.

31. The apparatus described in claim 30 further comprising timer means for establishing a preselected discrete time interval in response to an interruption in the occurrence of said marker pulses, direction change means for deriving from said direction control signal and within said discrete time interval an indication of a change in the direction in which said earth characteristic is sensed along said borehole, and first interrupter means for interrupting said progressive counting of said marker pulse in response to said derived indication of direction change.

32. The apparatus described in claim 31 wherein said fist interrupter means further comprises means for interrupting counting of marker pulses during the occurrence of not more than a preselected number of said marker pulses.

33. The apparatus described in claim 32 further including first indicator means for deriving from said direction control signal an indication of another further change in the direction in which said earth characteristic is sensed along said borehole, and second interrupt means for interrupting said progressive counting of said marker pulses in response to said indication of further direction change until the occurrence of the same number of uncounted marker pulse following said indication of further direction change as the number of uncounted marker pulses following said first mentioned indication of direction change.

34. The apparatus described in claim 33 further comprising real time generator means for progressively generating a real time electrical indication of said derived total of said supplementary and marker pulses in correlation with said progressively derived electrical logging signal, and recording means for recording said progressively derived electrical indication of said derived totals and said logging signal as a function of the true depth at which said characteristic of said materials is sensed along said borehole.

35. The apparatus described in claim 34 further comprising historical generator means for generating a compatible electrical representation of an historically derived measurement of a characteristic of said materials, and coupling means for coupling said compatible representation in correlation with said derived representation of said totals and said logging signal to said recording means.

36. The apparatus described in claim 35 including means for visually presenting said recorded compatible representation and said representation of said totals and said logging signal at a location remote from the well site.

37. A method of investigating the character of subsurface earth materials and the like traversed by a borehole, comprising deriving an electrical command signal as a function of borehole depth, deriving a first electrical measurement of said earth materials in response to said command signal, deriving a second electrical measurement of said earth materials, and adjusting said command signal in functional relation with said first and second measurements.

38. The method of claim 37 further comprising generating indications of depth functionally related to said first and second measurements, and adjusting said command signal in functional correlation with said indications of depth.

39. The method of claim 38 wherein said generating indications of depth includes generating a first indication of borehole depth functionally related to the depth in said borehole at which said first electrical measurement was derived, and generating a second indication of borehole depth functionally related to the depth in said borehole at which said second measurement was derived.

40. The method of claim 39, further including the step of correlating said electrical measurements in functional relationship with at least one of said indications of borehole depth.

41. The method of claim 40, further including the steps of selecting and comparing portions of said correlated electrical measurements as a function of said first and second indication of borehole depth, and adjusting said command signal as a function of said comparison of said measurements.

42. The method of claim 41 further comprising displaying said first and second measurements in spatial relation to said indications of depth, and adjusting said command signal as a function of said spatial relation.

43. The method of claim 42 wherein said command signal is derived as a function of discrete borehole depths.

44. The method of claim 43 further comprising deriving a third electrical measurement of said earth materials as a function of said adjusted command signal.

45. The method of claim 44 further including recording said first and second measurements prior to adjusting said command signal.

46. The method of claim 45 further including displaying said first and second measurements prior to adjusting said command signal.

47. The method of claim 46 wherein said displaying step further comprises displaying graphical and visual images of said first and second measurements.

48. The method of claim 47 wherein said first and second measurements are sampled as a function of depth.

49. The method of claim 48 wherein said first and second measurements are generated as a function of depth.

50. The method of claim 37 wherein the steps of deriving said
first and second electrical measurement further comprise,
deriving a first measurement of earth materials traversed by a first borehole, and
deriving a second measurement of earth materials traversed by another different borehole.

51. The method of claim 37 wherein said first and second measurements each comprise measurements of an identical earth parameter.

52. A method of investigating the character of subsurface earth materials and the like traversed by a borehole comprising
deriving a first measurement of said earth materials comprising a first portion, derived over a first increment of borehole and a second portion derived over a second increment of borehole,
deriving a second measurement of said earth materials over a third increment of borehole,
graphically displaying said first portion of said first measurement and said second measurement,
selecting correlative portions of said displayed first portion of said first measurement and said displayed second measurement,
generating a difference signal functionally related to any difference between the apparent depths at which said correlative portions were derived,
deriving a third measurement of said earth materials over an increment of borehole functionally related to said difference signal, and
displaying said second portion of said first measurement together with said third measurement.

53. The method of claim 52 wherein said selecting correlative portions comprises selecting portions of said displayed first portion of said first measurement and said displayed second measurement which are of substantially similar appearance.

54. A method for investigating lithological characteristics of subsurface earth materials traversed by a borehole, comprising
deriving a first digital measurement in real time of a selected characteristic of said materials progressively along the length of said borehole,
deriving a second digital measurement of a selected characteristic of said materials on an historical basis,
electrically displaying a visual representation of said first and second digital measurements on a real time basis in functional correlation with borehole depth,
generating a visual representation of a correlative fixed increment of the length of said borehole and said first and second measurement,
selecting a portion of said displayed second measurement, and
electrically correlating said selected portion of said second measurement with the correlative portion of said displayed first measurement,
deriving an electrical representation of the magnitude of any displacement between said portions of said measurements with respect to said increment of said borehole depth, and
correlating said portion of said second measurement with said portion of said first measurement as a function of said magnitude of said displacement.

55. The method described in claim 54 further comprising
electrically selecting a plurality of other portions of said second measurement in functional relationship to said magnitude of displacement, and
sequentially displaying each of said other portions in conjunction with said displayed increment of the length of said borehole within a discrete time interval.

56. The method described in claim 55 further comprising
visually displaying said other portions in sequence within a preselected discrete time interval for correlating said first and second measurements with respect to said increment of the length of said borehole within said time interval.

57. The method described in claim 56 further comprising
recording said first measurement on a real time basis and recording said second measurement in functional relationship with said recorded first measurement.

58. A method of investigating the character of subsurface earth materials and the like traversed by a borehole comprising
deriving an electrical command signal as a function of depth in said borehole,
deriving a first electrical measurement of said earth materials in response to said command signal,
deriving a second electrical measurement of said earth materials,
correlatively recording said first and second measurement signals as a function of said command signal,
recording said second measurement together with an indication of borehole depth,
recording said first measurement in combination with said second measurement and in functional response to said command signal.

59. The method described in claim 58 further including the step of correlating said command signal with said second measurement signal.

60. The method described in claim 59 further including the step of correlating said command signal with said second measurement signal while recording said first measurement signal in functional response to said command signal.

61. The method described in claim 60 further including incrementally adjusting said command signal to record said first measurement signal in correlation with said second measurement signal and said depth indication.

62. A method of surveying subsurface earth materials and the like traversed by a borehole, comprising progressively measuring a selected characteristic of said earth materials along a portion of the length of said borehole, generating an electrical command signal composed of a sequence of pulses functionally indicative of and related to different selected depths in and along said portion of said borehole, generating in response to said command signal pulses a first electrical data signal composed of digital representations of said measured characteristic of said earth materials at correlative ones of said different selected depths in said portion of said borehole, generating in functional relationship to said command signal pulses a second electrical data signal composed of digital representations of a measured characteristic of said earth materials at a sequence of functionally correlative depths in said borehole, generating an electrical indication of the depth in said borehole to which said representations composing said first data signal are related, deriving a correlative visible display of said first and second data signals and said electrical depth indications, incrementally adjusting said command signal as a function of any determined difference between said representations composing said first and second data signals and said indication of depth in said borehole, and correlatively recording said first and second data signals in functional relationship with said incrementally adjusted command signals.

63. A method of investigating the lithological characteristics of subsurface earth materials traversed by a borehole, comprising deriving a first digital measurement of a selected characteristic of said materials, electrically displaying a visual representation of said first digital measurement on a real time basis and in functional correlation with borehole depth, deriving a second digital measurement of a selected characteristic of said materials on an historical basis, and electrically displaying a visual representation of said second digital mesurement in functional correlation with said visual representation of said first digital measurement.

64. The method described in claim 63 including the steps of deriving said first measurement progressively along the length of said borehole, electrically displaying said first measurement together with a visual representation of a correlative fixed increment of the length of said borehole, and electrically displaying said second measurement in correlation with said increment of the length of said borehole.

65. The method described in claim 64 including the steps of selecting a portion of said displayed second measurement, and electrically correlating said selected portion of said second measurement with the correlative portion of said displayed first measurement.

66. The method described in claim 65 including the steps of deriving an electrical representation of the magnitude of any displacement between said portions of said measurements with respect to said increment of borehole depth, and correlating said portion of said second measurement with said portion of said first measurement as a function of said magnitude of said displacement.

67. The method described in claim 66, further comprising electrically selecting a plurality of other portions of said second measurement in functional relationship to said magnitude of displacement, and sequentially displaying each of said other portions in conjunction with said displayed increment of the length of said borehole within a discrete time interval.

68. The method described in claim 67, wherein said other portions are visually displayed in sequence within a preselected discrete time interval for correlating said first and second measurements with respect to said increment of the length of said borehole within said time interval.

69. The method described in claim 68, further comprising recording said first measurement on a real time basis, and recording said second measurement in functional relationship with said recorded first measurement.

70. The method described in claim 69, including the steps of selecting a recorded portion of said first measurement, and redisplaying a visual representation of said selected recorded portion in correlation with said increment of the length of said borehole.

71. The method described to claim 70, including the step of redisplaying the portion of said second measurement corresponding to said redisplayed portion of said first measurement.

72. The method described in claim 71, wherein said selected portion of said first measurement is redisplayed as a fixed visual image.

73. The method described in claim 71, wherein said selected portion of said first measurement is redisplayed as a moving visual image.

74. Apparatus for combining a plurality of well logging measurements and the like, comprising first signal means for electrically generating a first digital indication of the magnitude of a selected lithological parameter of the earth substances traversed by a borehole, second signal means for electrically generating a second digital indication of the magnitude of a selected lithological parameter of the earth substances traversed by a borehole, third signal means for electrically generating a third digital indication of borehole depth with respect to said final digital measurement, display means for generating a visual representation of said first, second and third digital indications, and adjustment means for linearly aligning said visual representation of said second digital indication with said first digital indication.

75. The apparatus of claim 74, including recording means for recording said first, second and third digital indications after said aligning of said visual representation.

76. The apparatus of claim 74, wherein said second signal means further includes storage means for storing said second measurement prior to generating said visual representation.

77. The apparatus of claim 74, wherein said adjustment means further includes
compensation means for generating said alignment in a continuous manner.

78. Method for combining a plurality of well logging measurements and the like, comprising
electrically generating a first digital indication of the magnitude of a selected lithological parameter of the earth substances traversed by a borehole,
electrically generating a second digital indication of the magnitude of a selected lithological parameter of the earth substances traversed by a borehole,
electrically generating a digital indication of borehole depth with respect to said first digital measurement,
displaying a visual representation of said first, second and third digital indications, and
aligning said visual representation of said second digital indication with said first digital indication.

79. The method of claim 78, including the step of recording said first, second and third digital indications after said aligning of said visual representation.

80. The method of claim 78, including the step of storing said second measurement prior to displaying said visual representation.

81. The method of claim 78, wherein the step of aligning said visual representation further includes
aligning said visual representation in a continuous manner.

82. Apparatus for investigating the subsurface earth materials traversed by a borehole, comprising
sensor means for progressively sensing at least one characteristic of said materials along a selected portion of the length of said borehole,
conversion means for progressively deriving an electrical logging signal in functional response to said sensed characteristic of said materials along said portion of said borehole,
generating means for generating an electrical depth signal composed of marker pulses each indicative of an appearance sequential increment of the length of said borehole along said selected portion thereof,
counter means for progressively counting said marker pulses in correlation with said logging signal, and
totaling means for deriving a total of said marker pulses as an indication of the apparent borehole depth at which the correlative portion of said logging signal is derived.

83. The apparatus described in claim 82, including
control signal means for deriving a direction control signal functionally indicative of the direction in which said earth characteristic is sensed along said borehole, and
controller means for controlling said progressive counting and totaling of said marker pulses in functional correlation with said direction control signal.

84. The apparatus described in claim 83, including discriminator means for activating said control signal means on a time dependent basis.

85. The apparatus described in claim 84, including
pulse generator means for generating supplementary pulses as a predetermined function of said derived total number of said marker pulses, and
addition means for deriving the further total of said supplementary pulses in said total marker pulses as an indication of the true depth in said borehole at which said correlative portion of said logging signal is derived.

86. The apparatus described in claim 85, including
register means for storing a preselected discreet time interval in response to an interruption in the occurrence of said marker pulses,
comparison means for deriving from said direction control signal and within said discreet time interval an indication of a change in the direction in which said earth characteristic is sensed along said borehole, and
switching means for interrupting said progressive counting of said marker pulses in response to said derived indication of direction change.

87. The apparatus described in claim 86, including interrupt means for interrupting said counting of said marker pulses during the occurrence of not more than a preselected number of said marker pulses.

88. The apparatus described in claim 87, including
indicator means for deriving from said direction control signal an indication of another further change in the direction in which said earth characteristic is sensed along said borehole, and
delay means for interrupting said progressive counting of said marker pulses in response to said indication of further direction change until the occurrence of the same number of uncounter marker pulses following said indication of further direction change as the number of uncounted marker pulses following said first mentioned indication of direction change.

89. A method for deriving indications of depth of a logging tool within a borehole comprising
progressively sensing at least one characteristic of said materials along a selected portion of the length of said borehole,
progressively deriving an electrical logging signal in functional response to said sensed characteristics of said materials along said portion of said borehole,
generating an electrical depth signal composed of marker pulses each indicative of an apparent sequential increment of the length of said borehole along said selected portion thereof,
progressively counting said marker pulses in correlation with said logging signal, and
deriving a total of said marker pulses as an indication of the apparent depth at which the correlative portions of said logging signal is derived.

90. The method described in claim 89 further comprising the steps of
deriving a direction control signal functionally indicative of the direction in which said earth characteristic is sensed along said borehole, and progressively counting and totalling said marker pulses in functional correlation with said direction control signal.

91. The method described in claim 90 wherein said direction control signal is derived on a time dependent basis.

92. The method described in claim 91 further comprising the steps of
generating supplementary pulses as a predetermined function of said derived total number of said marker pulses, and
deriving the further total of said supplementary pulses and said total marker pulses as an indication of the true depth in said borehole at which said correlative portion of said logging signal is derived.

93. The method described in claim 92 further comprising establishing a preselected discrete time interval in response to an interruption in the occurrence of said marker pulses,
deriving from said direction control signal and within said discrete time interval an indication of a change in the direction in which said earth characteristic is sensed along said borehole, and
interrupting said progressive counting of said marker pulses in response to said derived indication of direction change.

94. The method described in claim 93 wherein said counting of said marker pulses is interrupted during the occurrence of not more than a preselected number of said marker pulses.

95. The method described in claim 94 further including
deriving from said direction control signal an indication of another further change in the direction in which said earth characteristic is sensed along said borehole, and
interrupting said progressive counting of said marker pulses in response to said indication of further direction change until the occurrence of the same number of uncounted marker pulses following said indication of further direction change as the number of uncounted marker pulses following said first mentioned indication of direction change.

96. The method described in claim 95 further comprising
progressively generating a real time electrical indication of said derived totals of said supplementary and marker pulses in correlation with said progressively derived electrical logging signal, and
recording said progressively derived electrical indication of said derived totals and said logging signal as a function of the true depth at which said characteristic of said materials is sensed along said borehole.

97. The method described claim 96 further comprising generating a compatible electrical representation of an historically derived measurement of a characteristic of said materials, and
recording said compatible representation in correlation with said derived representation of said totals and said logging signal.

98. The method described in claim 97 including the step of visually presenting said recorded compatible representation and said representation of said totals and said logging signal at a location remote from the well site.

* * * * *

UNITED STATES PATENT AND TRADEMARK OFFICE
CERTIFICATE OF CORRECTION

PATENT NO. : 4,297,879

DATED : November 3, 1981

INVENTOR(S) : Howells et al

It is certified that error appears in the above-identified patent and that said Letters Patent is hereby corrected as shown below:

The sheets of drawings consisting of Figures 1, 2, 3 and 4 should be added as per attached sheets.

On the title page item [76] inventors --Ramon Viswanathan, 8623 Heatherview, Houston, Texas 77099-- replaces "Ronald E. Diederich" as co-inventor.

Item [73] Assignee -- the following should be added --Dresser Industries, Inc., Dallas, Tex.--.

Signed and Sealed this

Twenty-third Day of April 1985

[SEAL]

Attest:

DONALD J. QUIGG

Attesting Officer       Acting Commissioner of Patents and Trademarks

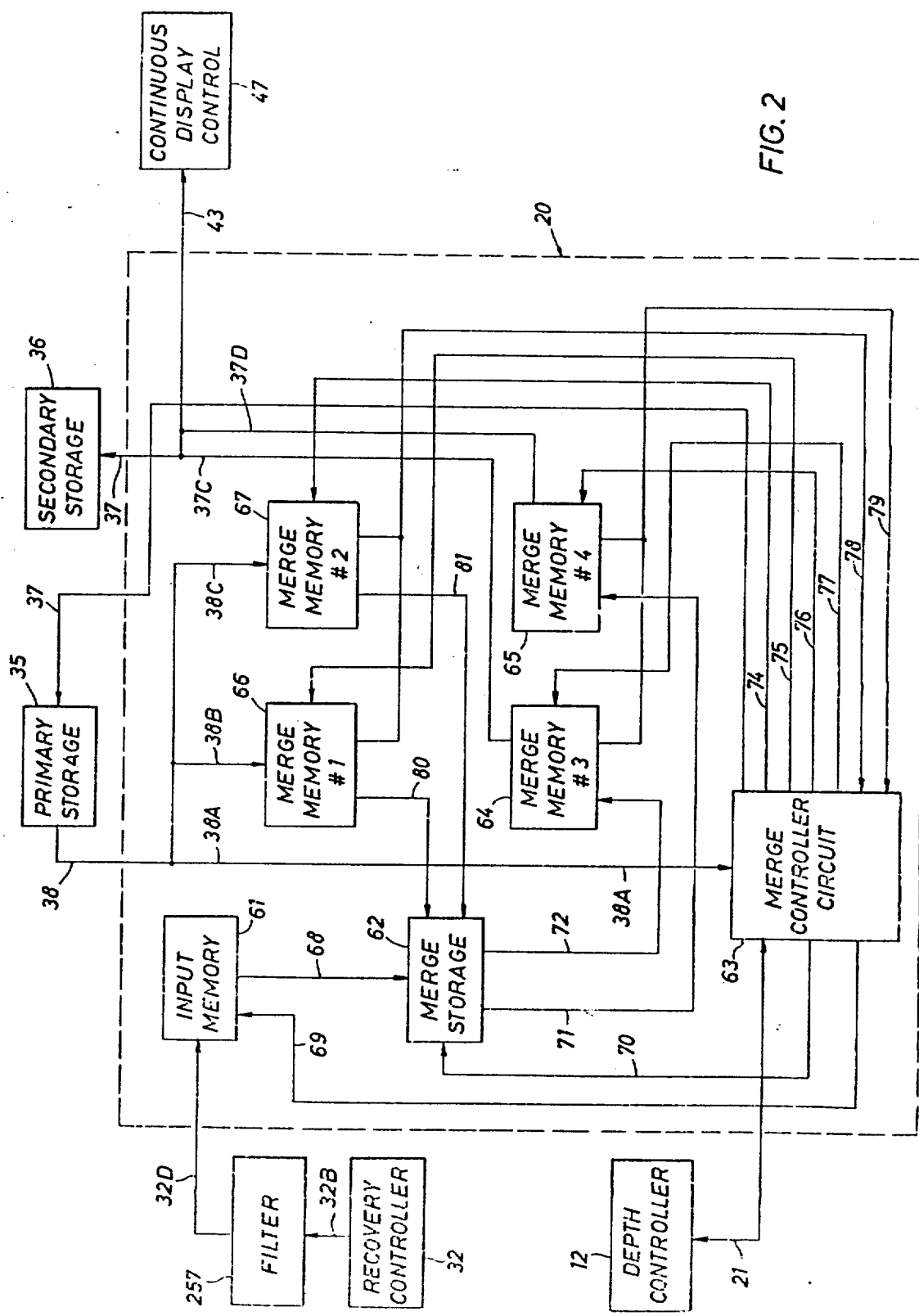

Patent No. 4,297,879